US010867432B2

(12) United States Patent
Lodato et al.

(10) Patent No.: US 10,867,432 B2
(45) Date of Patent: *Dec. 15, 2020

(54) METHODS AND SYSTEMS FOR RENDERING VIRTUAL REALITY CONTENT BASED ON TWO-DIMENSIONAL (2D) CAPTURED IMAGERY OF A THREE-DIMENSIONAL (3D) SCENE

(71) Applicant: Verizon Patent and Licensing Inc., Arlington, VA (US)

(72) Inventors: Michael Lodato, New Egypt, NJ (US); Rene Sepulveda, Fairfax Station, VA (US); Pai Moodlagiri, Clinton, NJ (US); Denny Breitenfeld, Florham Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/552,206

(22) Filed: Aug. 27, 2019

(65) Prior Publication Data
US 2019/0385356 A1 Dec. 19, 2019

Related U.S. Application Data

(63) Continuation of application No. 15/610,586, filed on May 31, 2017, now Pat. No. 10,417,810.

(51) Int. Cl.
*G06T 15/20* (2011.01)
*G06T 15/04* (2011.01)
(Continued)

(52) U.S. Cl.
CPC .............. *G06T 15/20* (2013.01); *G06T 15/04* (2013.01); *G06T 17/00* (2013.01); *G06T 17/20* (2013.01)

(58) Field of Classification Search
CPC ....... G06T 15/20; G06T 15/005; G06T 17/20; G06T 19/006
See application file for complete search history.

(56) References Cited

U.S. PATENT DOCUMENTS 8,654,135 B1 2/2014 Danskin
2004/0239670 A1 12/2004 Marks
(Continued)

FOREIGN PATENT DOCUMENTS

JP 2016-045266 4/2016

OTHER PUBLICATIONS

Dessein, Arnaud, et al. "Seamless texture stitching on a 3D mesh by Poisson blending in patches." 2014 IEEE International Conference on Image Processing (ICIP). IEEE, 2014. (Year: 2014).*
(Continued)

*Primary Examiner* — Daniel F Hajnik

(57) ABSTRACT

An exemplary method includes a virtual reality content rendering system receiving two-dimensional ("2D") color data and depth data captured by a plurality of capture devices disposed at different vantage points in relation to a three-dimensional ("3D") scene, receiving metadata, generating, for each vantage point associated with each respective capture device included in the plurality of capture devices, and based on the metadata and the depth data, a partial 3D mesh projected into a virtual 3D space to produce a partial representation of the 3D scene in the virtual 3D space, and generating, based on the partial 3D meshes projected into the virtual 3D space, and from an arbitrary viewpoint within the virtual 3D space, an image view of the virtual 3D space. The generating of the image view may include blending color samples of overlapping sections off the partial 3D meshes projected into the virtual 3D space.

20 Claims, 22 Drawing Sheets

(51) Int. Cl.
*G06T 17/00* (2006.01)
*G06T 17/20* (2006.01)

(56) References Cited

U.S. PATENT DOCUMENTS

| | | |
|---|---|---|
| 2013/0222369 A1 | 8/2013 | Huston et al. |
| 2014/0184626 A1 | 7/2014 | Narayanan et al. |
| 2020/0051336 A1* | 2/2020 | Ichikawa ............ G06F 3/04815 |

OTHER PUBLICATIONS

Haque, Mohammadul, Avishek Chatterjee, and Venu Madhav Govindu. "High quality photometric reconstruction using a depth camera." Proceedings of the IEEE Conference on Computer Vision and Pattern Recognition. 2014. (Year: 2014).*

Alexiadis, et al., "Real-time, full 3-D reconstruction of moving foreground objects from multiple consumer depth cameras", IEEE Transactions on Multimedia 15.2 (2013): 339-358. (Year: 2013).

Alj, et al., "Space carving MVD sequences for modeling natural 3D scenes", Visual Communications and Image Processing; Jan. 20, 2004; San Jose; Three-Dimensional Image Processing (3DIP) and Applications II, Burlingame, CA, USA, vol. 8920, Jan. 1, 2012, 15 pages.

Carpenter, "The A-buffer, an antialiased hidden surface method", ACM Siggraph Computer Graphics 18.3 (1984): 103-108. (Year: 1984).

Johnson, et al., "Registration and integration of textured 3D data", Image and vision computing 17.2 (1999): 135-147, (Year: 1999).

Pece, et al., "Adapting Standard Video Codecs for Depth Streaming", Joint Virtual Reality Conference of EuroVR—EGVE (2011 ), R. Blach, S. Coquillart, M. D'Cruz, A. Steed, and G. Welch (Editors), Department of Computer Science, University College London, UK, (Year: 2011).

Pulli, et al., "Surface Reconstruction and Display From Range and Color Data", Graphical Models, Elsevier, San Diego, CA, US, vol. 62, No. 3, May 1, 2000, pp. 165-201.

Pulli, et al., "View-based rendering: Visualizing real objects from scanned range and color data", Rendering techniques' 97. Springer, Vienna, 1997. 23-34. (Year: 1997).

* cited by examiner

```
{
  "sources": [
  {
    // Stream IDs
    "color": { "stream": 32 },
    "depth": { "stream": 33 }, // depth mapping
    "near": 10.0,
    "far" : 20.0, // 3x4 column-major transform matrix
    "transform": [
    1, 0, 0,
    0, 1, 0,
    0, 0, 1,
    0, 0, 0
    ], // FOV tangent angles, to image edge (not edgemost sample center)
    "fov":{
    "tanX0": -0.2, // left
    "tanX1": 0.2, // right
    "tanY0": -0.1, // bottom
    "tanY1": 0.1 // top
    }
  }
  ]
}
```

Fig. 19

METHODS AND SYSTEMS FOR RENDERING VIRTUAL REALITY CONTENT BASED ON TWO-DIMENSIONAL (2D) CAPTURED IMAGERY OF A THREE-DIMENSIONAL (3D) SCENE

RELATED APPLICATIONS

This application is a continuation application of U.S. patent application Ser. No. 15/610,586, filed May 31, 2017, and entitled "Methods and Systems for Rendering Virtual Reality Content Based on Two-Dimensional ("2D") Captured Imagery of a Three-Dimensional ("3D") Scene," which is hereby incorporated by reference in its entirety.

BACKGROUND INFORMATION

Advances in computing and networking technology have made new forms of media content possible. For example, virtual reality media content is available that immerses viewers (or "users") into interactive virtual reality worlds that the users may experience by directing their attention to any of a variety of things being presented in the virtual reality world at the same time. At any time during the presentation of the virtual reality media content, a user experiencing the virtual reality media content may look around and/or move within the virtual reality world in any direction with respect to both a horizontal dimension (e.g., forward, backward, left, right, etc.) and a vertical dimension (e.g., up, down, etc.), giving the user a sense that he or she is actually present in and experiencing the virtual reality world from a particular viewpoint within the virtual reality world.

In some examples, a virtual reality media provider may provide virtual reality content that includes a virtual reality world by transmitting, by way of a network, data representative of the virtual reality world to a client computing device being used by a user to experience the virtual reality world.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 19 illustrates an exemplary implementation for metadata according to principles described herein.

DETAILED DESCRIPTION OF PREFERRED EMBODIMENTS

Figure 1:
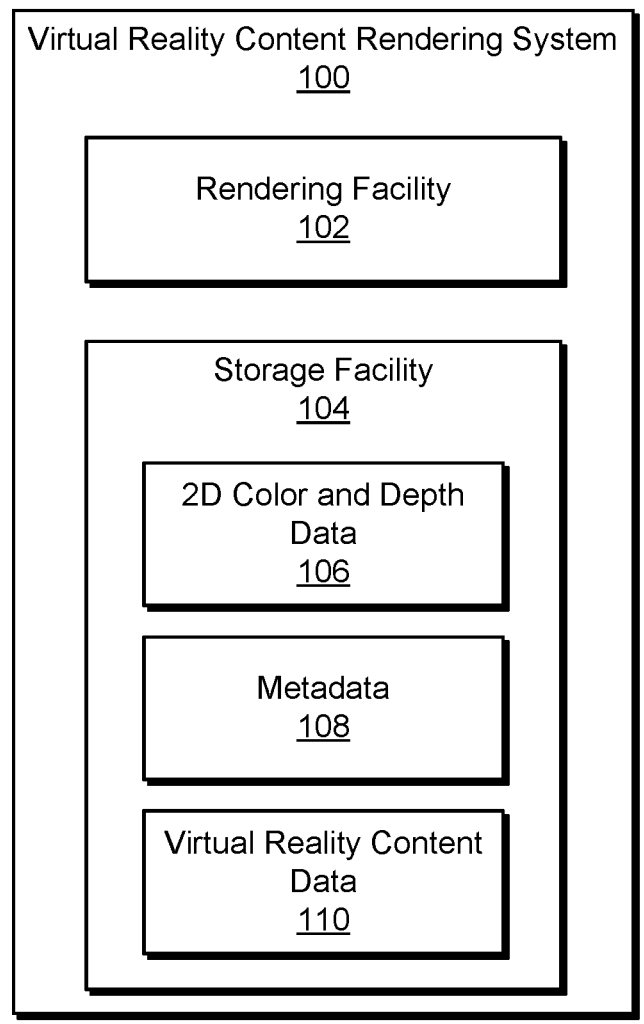
FIG. 1 illustrates an exemplary virtual reality content rendering system according to principles described herein.

Methods and systems for rendering virtual reality content based on 2D captured imagery of a 3D scene are described herein. In certain exemplary methods and systems, a virtual reality content rendering system ("rendering system") may receive data representative of 2D imagery of a 3D scene (e.g., a real-world scene) as captured by a plurality of capture devices (e.g., video cameras, 3D depth scanning hardware, etc.) physically disposed at different vantage points in relation to the 3D scene (e.g., at different positions having different capture angles in relation to the 3D scene). The captured 2D imagery, which may be referred to as surface data, may include 2D color data and depth data for surfaces of one or more objects in the 3D scene, as captured by each capture device included in the plurality of capture devices.

The 2D color data and depth data captured by each of the capture devices may represent a distinct unmeshed view of the 3D scene from a particular vantage point relative to the 3D scene. As used herein, a "distinct unmeshed view" corresponds to a view of a 3D scene from a particular capture device in which the surface data for the 3D scene (e.g., the 2D color data and depth data) captured by the particular capture device is not represented as a 3D mesh of geometric primitives and/or is not combined (i.e., not meshed) together with the surface data captured by another capture device to form a 3D model or 3D representation of the 3D scene.

The rendering system may also receive metadata such as projection metadata for the 2D color data and depth data. The metadata may include information associated with the 3D scene, such as information about the plurality of capture devices, that is usable by the rendering system to project the 2D color data and depth data into a virtual 3D space to produce virtual representations of the 3D scene in the virtual 3D space such that the projected data may be used by the rendering system to render a view of the virtual 3D space (i.e., a view of the virtual representations of the 3D scene in the virtual 3D space) from an arbitrary viewpoint within the virtual 3D space.

Based on the received data (e.g., the metadata and the depth data), the rendering system may generate, for each vantage point associated with each respective capture device, a partial 3D mesh projected into a virtual 3D space to produce a partial virtual representation of the 3D scene in the virtual 3D space. In certain examples, the generating of each partial 3D mesh may include the rendering system projecting, for each vantage point associated with each respective capture device, a 2D input mesh along perspective rays to depths within the virtual 3D space based on the depth data to produce 3D coordinates of vertices of primitives of the partial 3D mesh in the virtual 3D space. In certain examples, the generating of each partial 3D mesh may also include the rendering system identifying, for each partial 3D mesh, one or more of the primitives of the partial 3D mesh as extraneous primitives and removing the identified extraneous primitives from each partial 3D mesh.

Based on the partial 3D meshes projected into the virtual 3D space for the vantage points associated with the capture devices, the rendering system may generate, from an arbitrary viewpoint within the virtual 3D space, an image view of the virtual 3D space. In certain examples, the generating of the image view of the virtual 3D space includes the rendering system accumulating the partial 3D meshes projected into the virtual 3D space and blending, based on the 2D color data, color samples for the partial 3D meshes to form the image view of the virtual 3D space. In certain examples, the accumulating of the partial 3D meshes projected into the virtual 3D space may include accumulating the partial 3D meshes in a frame buffer of a graphics processing unit ("GPU") and additively blending the color samples for the partial 3D meshes in the frame buffer of the GPU. In certain examples, the blending of the color samples may include the rendering system determining blend weights for the primitives of the partial 3D meshes, weighting the color samples for the partial 3D meshes based on the determined blend weights for the primitives of the partial 3D meshes, and determining weighted averages of the weighted color samples for superimposed primitives included in overlapping sections of the partial 3D meshes. In certain examples, the rendering system may determine an accumulation region and accumulate and blend only primitives or fragments that are located within the accumulation region.

Illustrative examples of the above-stated principles and operations, as well as additional and/or alternative principles and operations, are described herein. For sake of clarity and explanation, certain illustrative examples are described and illustrated herein using simplified data sets (e.g., data sets representing a simple 3D scene, object, 2D input mesh, partial 3D mesh, etc.). However, it will be understood that the principles and operations described herein may be applied to larger and/or more complex data sets.

Methods and systems described herein provide one or more advantages and/or benefits over conventional virtual reality content rendering technologies. For example, methods and systems described herein may significantly reduce computing resources (e.g., memory and/or processing resources) required to render virtual reality content. To illustrate, by using 2D color data, depth data, and metadata to generate, accumulate, and blend partial 3D meshes to form an image view of a virtual 3D space as described herein, a rendering system can render virtual reality content (e.g., the image view of the virtual 3D space from an arbitrary and dynamically selectable viewpoint in the virtual 3D space) without having to receive or generate a complete 3D model of a 3D scene, such as a single, cohesive geometric mesh of the 3D scene. This results in a savings of transmission bandwidth, processing requirements, and memory.

Additionally or alternatively, by using 2D color data, depth data, and metadata to generate, accumulate, and blend partial 3D meshes to form an image view of a virtual 3D space as described herein, methods and systems described herein may use existing video processing technologies (e.g., video rendering technologies) and existing graphics hardware (e.g., existing graphics cards and pipelines) and/or software to render virtual reality content, which may support scalability of virtual reality content services to a wider range of end-user computing devices and/or expand the accessibility of virtual reality content to users of various end-user computing devices.

Additionally or alternatively, by using 2D color data, depth data, and metadata to generate, accumulate, and blend partial 3D meshes to form an image view of a virtual 3D space as described herein, methods and systems described herein may render virtual reality content faster than the virtual reality content would be rendered using conventional rendering technologies. This may support applications in which virtual reality content is streamed and rendered in real time or near real time, such as for virtual reality content representing an event as the event occurs in real time.

Additionally or alternatively, by using 2D color data, depth data, and metadata to generate, accumulate, and blend partial 3D meshes to form an image view of a virtual 3D space as described herein, methods and systems described herein may facilitate significant reduction in the amount of bandwidth required to provide virtual reality content to a media player device by way of a network. For example, instead of generating a 3D model of a 3D scene prior to transmission, 2D data representative of distinct unmeshed views of a 3D scene may be generated and transmitted to a media player device by way of a network. This significantly reduces the amount of data that is required to be processed server-side and transmitted over the network, which may enable streaming of virtual reality content at increased speeds with reduced processing and/or bandwidth requirements, which may improve data throughput and latency.

The systems and methods described herein may provide additional or alternative benefits as may serve a particular implementation. Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary virtual reality content rendering system 100 ("system 100") that may process 2D color data, depth data, and metadata to generate, accumulate, and blend partial 3D meshes to form an image view of a virtual 3D space in accordance with methods and systems described herein. As shown, system 100 may include, without limitation, a rendering facility 102 and a storage facility 104 selectively and communicatively coupled to one another. In certain alternative examples, storage facility 104 may be excluded from and communicatively coupled to system 100. It will be recognized that although facilities 102 and 104 are shown to be separate facilities in FIG. 1, facilities 102 and 104 may be combined into fewer facilities, such as into a single facility, or divided into more facilities as may serve a particular implementation. Each of facilities 102 and 104 may include or be housed in a device (e.g., a media player device having a single chassis) and located at a single location (e.g., a user premises such as a residence, a business, etc. or another location associated with a user of a media player device) or distributed between multiple devices and/or multiple locations as may serve a particular implementation. Each of facilities 102 and 104 will now be described in more detail.

Storage facility 104 may store 2D color and depth data 106, metadata 108, virtual reality content data 110, and/or any other data received, generated, managed, maintained, used, and/or transmitted by rendering facility 102. 2D color and depth data 106 may include 2D color data and depth data that may be received by rendering facility 102 and that is representative of one or more objects in a 3D scene, such as the appearance and location of the objects in the 3D scene.

In certain examples, the 3D scene may be a real-world scene, such as a 3D scene of a real-world event that may be occurring live (e.g., in real time). In such examples, the 3D scene may include one or more real-world objects associated with the real-world event, and 2D color and depth data 106 may be acquired in real time as the real-world event occurs. In other examples, the 3D scene may be a virtual scene that includes one or more virtual objects. In other examples, the 3D scene may be a merged-reality scene, and the 3D scene may include at least one virtual object and at least one real-world object. The 3D scene may be considered a 3D scene because each object and/or surface in the 3D scene, whether real or virtual, has a detectable position in 3D space with respect to the 3D scene and other objects in the 3D scene.

As used herein, an "object" may include anything that is visible (i.e., non-transparent) from a particular vantage point in a 3D scene, whether living or inanimate. For example, if the 3D scene corresponds to a real-world event such as a basketball game, objects may include the basketball being used for the game, the basketball court, the basketball standards (i.e., the backboards, rims, nets, etc.), the players and referees participating in the game, and/or any other object present at and/or associated with the basketball game.

As used herein, "2D color data" may broadly include any data representative of how a 3D scene appears from at least one vantage point of at least one device capturing the 2D color data. The 2D color data may include a color (e.g., red, green, blue, etc.) representation of the 3D scene, a black and white representation of the 3D scene, a greyscale representation of the 3D scene, and/or any other suitable representation of the appearance of the 3D scene. In certain examples, the 2D color data may include a captured sequence of images (e.g., high-resolution still images) representative of the appearance of the 3D scene (e.g., an object at a real-world event) from a vantage point over a particular time period. For instance, the 2D color data may include 2D color video data of the 3D scene in which a frame of video represents color values at pixel coordinates of the frame. However, the 2D color data is not limited to any particular format, file type, frame rate, resolution, quality level, or other characteristic that may be associated with various definitions and/or standards defining video in the art.

As used herein, "depth data" may broadly include any data representative of spatial positions of one or more objects (e.g., one or more objects at a real-world event) within the 3D scene. The depth data may be formatted in any suitable manner. In certain examples, as will be described below, the depth data may be formatted as a series of sequential 2D depth data captures (e.g., separate instances of depth data captured at particular times) from a particular vantage point. For instance, the depth data may include 2D depth video data of the 3D scene from a particular vantage point and in which a frame of video represents depth values at pixel coordinates of the frame. However, the depth data is not limited to any particular format, file type, frame rate, resolution, quality level, or other characteristic that may be associated with various definitions and/or standards defining video in the art. Preferably, the depth data has high precision and accuracy. However, the depth data may have generally lower resolution (e.g., lower x and y coordinate resolution) than the 2D color data and still be acceptable.

The depth data may be synchronized with the 2D color data. For example, a depth data frame in the depth data and a color data frame in the color data may correspond with a common instance in time (e.g., a same reference signal, timestamp, capture time, etc.). Such a corresponding depth data frame and color data frame may form a pair of synchronized frames that, together with synchronized pairs of other depth and color data frames captured from other vantage points, and with corresponding metadata, may be processed by rendering facility 102 in any suitable manner, such as described herein, to generate, accumulate, and blend partial 3D meshes to form an image view of a virtual 3D space.

The 2D color data and the depth data may be captured by a plurality of capture devices disposed at different vantage points in relation to a 3D scene. The capture devices may include, for example, 2D video cameras, 3D depth scanners, combination capture devices (e.g., devices configured to capture both 2D video and associated depth data), and so forth. Each capture device included in the plurality of capture devices may capture 2D color data and depth data for the 3D scene from a particular vantage point in relation to the 3D scene. As used herein, a "vantage point" refers to a position and capture angle at which surface data of a 3D scene is captured by each capture device included in the plurality of capture devices. In certain examples, the vantage point of a particular capture device may be fixed (i.e., the position of the particular capture device and the capture angle of the particular capture device do not change over time). Alternatively, one or more of the position and the capture angle of a particular capture device may change over time. For example, the position and/or the capture angle of a particular capture device may change over time as an apparatus to which the particular capture device is fixed moves in relation to the 3D scene. A vantage point may be described by any other suitable information as may suit a particular implementation. Exemplary vantage points of capture devices are described herein.

The plurality of capture devices may capture 2D color data and depth data in any suitable manner and using any suitable devices as may serve a particular implementation. In certain examples, the capture devices may consist of video cameras or other types of image capture devices that may capture 2D color data of objects in a 3D scene from multiple vantage points and from which depth data for the surfaces of the objects may be captured (e.g., derived) by using one or more depth capture techniques (e.g., triangulation-based depth capture techniques, stereoscopic depth capture techniques, etc.).

In other examples, the capture devices may include video cameras or other types of image capture devices configured to capture the 2D color data, as well as separate depth capture devices configured to capture the depths of the surfaces of the objects using one or more of the depth capture techniques (e.g., time-of-flight-based depth capture techniques, infrared-based depth capture techniques, etc.). For example, each capture device may include a first component (e.g., a video camera device) configured to capture 2D video of objects at which the first component is directed, and a second component (e.g., a depth camera device, a 3D imaging or 3D scanning device, etc.) configured to capture depth data of objects at which the second component is directed. In this example, the first component and the second component may be separate or discrete devices, but may be communicatively coupled and configured to work in conjunction with one another to synchronously (e.g., simultaneously) capture both the 2D color data and the depth data.

In other examples, each capture device may comprise a combination video-depth capture device (e.g., a specially-designed video camera) that is configured to capture both the 2D color data and the depth data. The combination video-depth capture device may be a commercially available or specially-designed video camera capable of not only capturing video data of objects in a 3D scene but also detecting corresponding depths of the objects using one or more suitable depth capture techniques.

In some examples, the capture devices may have finite capture angles (e.g., 90 degrees, 120 degrees, etc.) and may be positioned and directed to capture data from respective areas of a 3D scene. For example, a ring configuration of capture devices may be positioned to surround a 3D scene or one or more portions of the 3D scene (e.g., a basketball court, turns on a racetrack) and be pointed inwardly to capture data representative of objects in the 3D scene. In the same or other examples, at least one particular capture device may have a 360-degree capture angle and may be positioned to capture data from objects surrounding the particular capture device. For example, at least one of capture devices may be a 360-degree camera configured to capture and/or generate a 360-degree video image of the 3D scene around a center point corresponding to the 360-degree camera. While certain exemplary configurations of capture devices relative to a 3D scene are described herein, the examples are illustrative only. Any suitable configuration of capture devices relative to a 3D scene may be used in other implementations.

The plurality of capture devices may be communicatively coupled to one another (e.g., networked together) and/or communicatively coupled to another device or system (e.g., system 100) in any suitable manner, such as described herein. This may allow the capture devices to maintain synchronicity in time, position, angle, etc. For example, the capture devices may send and receive timing signals to ensure that each capture device captures corresponding data at a common time (e.g., within a threshold range of time) and that the data captured by different capture devices may be timestamped with a universal time shared by all of the capture devices. In certain examples, a controller may direct the capture devices as to when to capture and/or output data for a 3D scene. In other examples, the capture devices may control when data for a 3D scene is captured and/or output, and any suitable facility may sort and/or selectively use the data received from the capture devices. These examples of how capture devices may function synchronously are exemplary only. Any suitable device synchronization and/or communication technologies may be used in other implementations to facilitate operations of capture devices to synchronously capture data for a 3D scene. In certain alternative examples, one or more of the plurality of capture devices may function asynchronously and the data captured for the 3D scene may be processed and synchronized in any suitable manner after capture.

Metadata 108 may include any information that may be used by rendering facility 102, together with 2D color data and depth data for a 3D scene, to generate virtual representations of the 3D scene in a virtual 3D space and to form an image view of the virtual 3D space from an arbitrary viewpoint within the virtual 3D space. For example, metadata 108 may include projection metadata that may include any information that may be used by rendering facility 102, together with 2D color data and depth data for a 3D scene, to project 2D color data and depth data for the 3D scene into a common virtual 3D space to generate virtual representations of the 3D scene in the virtual 3D space. Metadata 108 may include, but is not limited to, information indicating temporal and spatial information associated with 2D color data for the 3D scene, such as when the 2D color data was captured, a vantage point from which the 2D color data was captured, which capture device captured the 2D color data, etc. In addition, metadata 108 may include information indicating temporal and spatial information associated with depth data for the 3D scene, such as when the depth data was captured, where the depth data was captured, a vantage point from which the depth data was captured, which capture device captured the depth data, etc. Metadata 108 may also include field of view information (e.g., focal length, optical center, view angles, tangents of angles, etc.), depth mapping information, position information, orientation information, view angle information, translation information, transformation matrix information, changes in any of such information for each capture device, and/or information about any other intrinsic and/or extrinsic properties of the capture devices. In some examples, metadata 108 may include information about coordinate systems (e.g., local coordinate systems associated with the capture devices and/or scene), projection parameters, projection calculations, lens distortion parameters, and/or any other information useful for processing 2D color and depth data in any of the ways described herein. In certain examples, metadata 108 may also include positional information for audio samples captured with respect to the 3D scene. Metadata 108 may be represented in any suitable format as may serve a particular implementation, such as Java Script Object Notation ("JSON"), Extensible Markup Language ("XML"), or the like. Exemplary formats for metadata 108 are described herein.

Immersive virtual reality content data 110 may include any data representative of virtual reality content generated by rendering facility 102 based on 2D color data, depth data, and metadata associated with a 3D scene. For example, virtual reality content data 110 may include data representing generated partial 3D meshes projected into a virtual 3D space, data representing generated image views of the virtual 3D space from arbitrary viewpoints within the virtual 3D space, and/or any other suitable data that may be generated by rendering facility 102 to provide an image view of a virtual representation of a 3D scene in a virtual 3D space from an arbitrary viewpoint within the virtual 3D space. Examples of such data are described herein. In certain examples, virtual reality content data 110 may also include audio data associated with a generated virtual representation of a 3D scene, and/or any other suitable data associated with a generated virtual representation the 3D scene. Storage facility 104 may further include any other data as may be used by rendering facility 102 to form an image view of a virtual representation of a 3D scene in a virtual 3D space from an arbitrary viewpoint within the virtual 3D space as may serve a particular implementation.

Rendering facility 102 may include any hardware and/or software (e.g., computing systems, software programs, graphics processing hardware, etc.) used for generating, accumulating, and blending partial 3D meshes based on 2D color data, depth data, and metadata to form an image view of a virtual 3D space. In certain examples, rendering facility 102 may include a graphics card having dedicated video decoding hardware (e.g., one or more dedicated video decoders) and a programmable GPU.

Rendering facility 102 may receive 2D color data and depth data captured by a plurality of capture devices disposed at different vantage points in relation to a 3D scene. Rendering facility 102 may also receive metadata (e.g., metadata 108) for the 2D color data and the depth data. Rendering facility 102 may receive 2D color data, depth data, and metadata in any suitable manner and from any suitable source. To illustrate, FIG. 2 shows an exemplary configuration 200 in which rendering facility 102 receives data from a plurality of capture devices 202 (e.g., capture devices 202-1 through 202-*n*) that are physically disposed at different vantage points (e.g., vantage points 204-1 through 204-*n*) in relation to a 3D scene 206 that includes an object 208.

The plurality of capture devices 202 may be disposed (i.e., located, installed, etc.) at fixed positions with respect to 3D scene 206 in any way that may serve a particular implementation. For example, capture devices 202 may be located at fixed positions surrounding a real-world event or one or more portions of the real-world event (e.g., surrounding or partially surrounding a field of play of a sporting event such as a basketball court at a basketball game).

Figure 2:
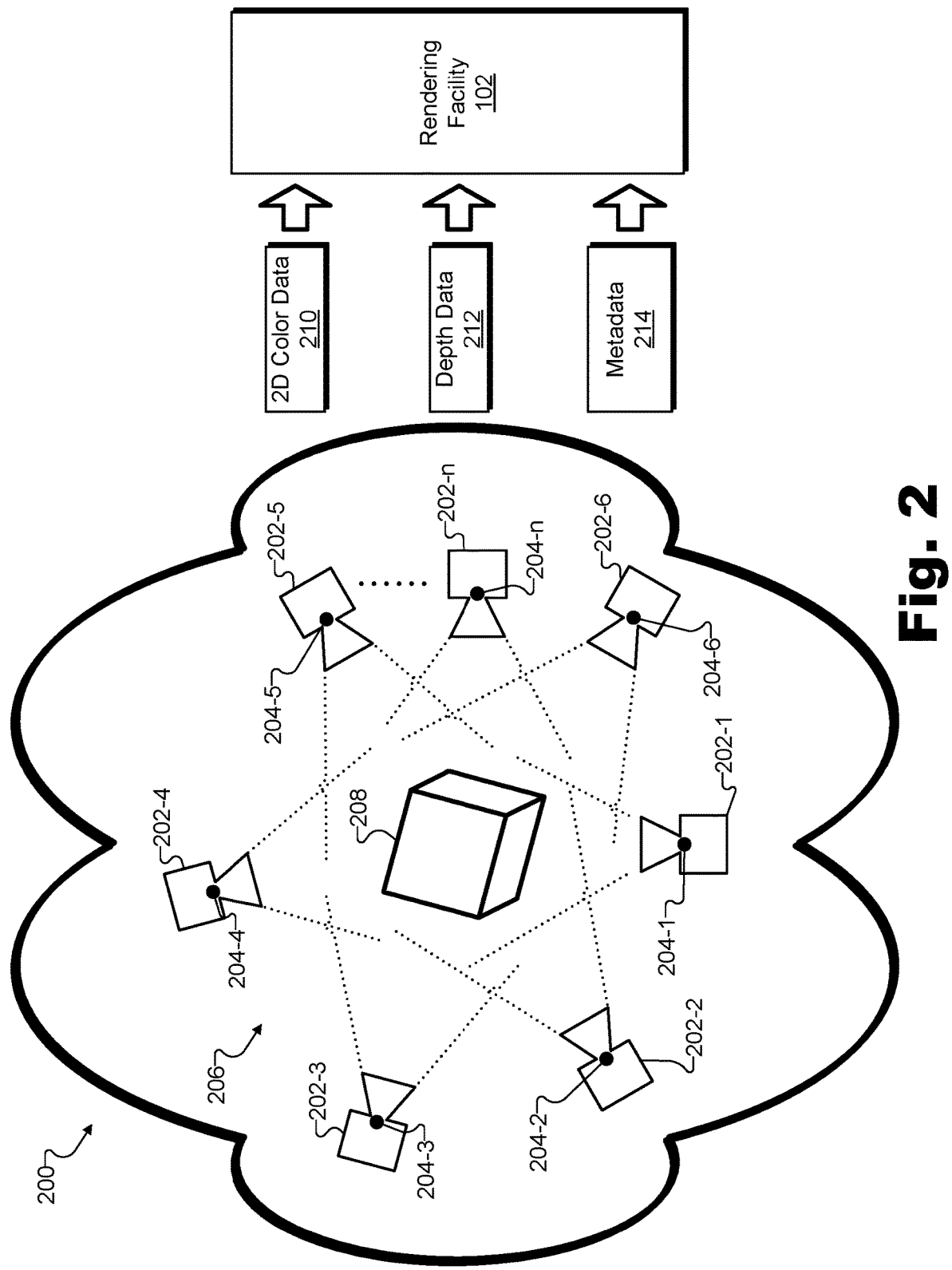
FIG. 2 illustrates an exemplary configuration in which a rendering facility of the system of FIG. 1 receives and processes data associated with a 3D scene to render virtual reality content representative of the 3D scene according to principles described herein.

In the example shown in FIG. 2, each of vantage points 204 provides a different limited view of 3D scene 206 and of object 208 in 3D scene 206. For example, vantage point 204-2 of capture device 202-2 may provide a view from above object 208. From vantage point 204-2, capture device 202-2 may not be capable of capturing 2D color data and depth data for a bottom surface of object 208. However, capture device 202-1 may be positioned below object 208 and able to capture 2D color data and depth data for the bottom surface of object 208 from vantage point 204-1. Accordingly, capture devices 202 may be configured to, in combination, capture 2D color data and depth data for all of the surfaces of object 208. Capture devices 202 may be communicatively coupled to each other and to rendering facility 102 in any suitable manner, such as described herein.

As shown in FIG. 2, rendering facility 102 may receive 2D color data 210, depth data 212, and metadata 214. Rendering facility 102 may receive 2D color data 210, depth data 212, and metadata 214 directly or indirectly from capture devices 202 using any suitable data communication channels and/or technologies. In certain examples, rendering facility 102 may receive 2D color data 210, depth data 212, and metadata 214 from capture devices 202 through one or more suitable data communication networks. For example, rendering facility 102 may receive at least some of 2D color data 210, depth data 212, and metadata 214 by way of a content delivery network ("CDN") such a CDN capable of carrying streaming video and/or other data (e.g., a CDN operated by Amazon Web Services). Exemplary data communication networks through which rendering facility 102 may receive 2D color data 210, depth data 212, and metadata 214 are described herein.

2D color data 210, depth data 212, and metadata 214 received by rendering facility 102 may be represented using any suitable data formats and/or data communication protocols, formats, and technologies. Examples of such data formats and communication streams are described herein.

Based on received data for a 3D scene (e.g., metadata and depth data for a 3D scene), rendering facility 102 may generate, for each vantage point associated with each respective capture device associated with the 3D scene, a partial 3D mesh projected into a virtual 3D space to produce a partial representation of the 3D scene in the virtual 3D space. With respect to FIG. 2, for example, based on the received metadata 214 and the received depth data 212, rendering facility 102 may generate, for each of the vantage points 204 respectively associated with each of the capture devices 202, a partial 3D mesh projected into a virtual 3D space to produce a partial representation of 3D scene 206 (and thus object 208) in the virtual 3D space.

As used herein, a "virtual 3D space" may represent a 3D space of a virtual 3D world and may be represented based on a set of virtual 3D world coordinates. The virtual 3D space may be defined to be any suitable 3D space that can accommodate partial 3D meshes projected into the 3D space to produce partial virtual representations of a captured 3D scene in the 3D space. In certain examples, rendering facility 102 may define the virtual 3D space based at least in part on metadata such as information about a depth mapping range, a field of view, and a transformation matrix for each vantage point of each capture device.

A partial 3D mesh projected into a virtual 3D space may include a mesh of geometric primitives (e.g., triangles, points, lines, polygons, complex geometric shapes, etc.) interconnecting and/or formed by a set of vertices projected to 3D coordinates within the virtual 3D space. As such, a partial 3D mesh projected into the virtual 3D space based on depth data for a 3D scene may produce a partial virtual representation of the 3D scene (e.g., 3D scene 206), and thus of one or more objects within the 3D scene (e.g., object 208 within 3D scene 206). The partial virtual representation of the 3D scene may be referred to as a partial virtual reconstruction of the 3D scene and may virtually represent surfaces of one or more objects in the 3D scene. A "partial 3D mesh," as used herein, is a partial 3D mesh, and not a single, cohesive 3D mesh for an entire 3D scene, in that the partial 3D mesh represents only a partial view of a 3D scene, a view from a single vantage point associated with a single respective capture device. As described herein, rendering facility 102 may generate and use a partial 3D mesh individually or a plurality of partial 3D meshes to render virtual reality content, without having to construct or use a complete 3D model of a 3D scene, such as a single, cohesive 3D mesh of a 3D scene. Examples of partial 3D meshes that may be generated by rendering facility 102 are described herein.

In certain examples, the partial 3D mesh projected into the virtual 3D space may produce a partial geometric representation of a captured 3D scene in the virtual 3D space without color samples from the 2D color data for the captured 3D scene associated with the partial 3D mesh. In other examples, the partial 3D mesh projected into the virtual 3D space may produce a partial geometric representation of a captured 3D scene in the virtual 3D space with color samples from the 2D color data for the captured 3D scene associated with the partial 3D mesh. Thus, in certain examples, the generating of the partial 3D mesh projected into the virtual 3D space may be further based on the received 2D color data 210 to associate color samples from the 2D color data 210 with vertices and/or primitives of the partial 3D mesh projected into the virtual 3D space as part of the generating of the partial 3D mesh. In other examples, rendering facility 102 may perform one or more operations separate from the generating of the partial 3D mesh (after the partial 3D mesh is generated) to associate color samples from the 2D color data 210 with vertices and/or primitives of the partial 3D mesh projected into the virtual 3D space.

Rendering facility 102 may generate a partial 3D mesh for each vantage point of a 3D scene in any suitable manner. For example, rendering facility 102 may instantiate in memory and project a 2D input mesh along perspective rays to depths within a virtual 3D space based on the depth data received by rendering facility 102. A 2D input mesh may include a set of vertices arranged in a grid of normalized coordinates in a 2D plane to form a set of geometric primitives interconnecting the vertices. For example, the 2D input mesh may include a 2D grid of vertices and geometric primitives (e.g., triangles, points, lines, polygons, complex geometric shapes, etc.) formed by interconnecting the vertices with edges and covering an arbitrary, predetermined range (e.g., a signed, normalized range, [−1, 1] that may simplify one or more computations). Exemplary 2D input meshes are described herein.

Rendering facility 102 may project a 2D input mesh along perspective rays, from a vantage point, to depths within a virtual 3D space based on depth data received by rendering facility 102 and associated with the vantage point. For example, rendering facility 102 may project vertices of the 2D input mesh to depths within the virtual 3D space to determine 3D coordinates of the vertices within the virtual 3D space. The projection of the vertices of the 2D input mesh to the 3D coordinates may determine shapes, orientations, depths, etc. of the primitives of the 2D input mesh and may convert the 2D input mesh to a partial 3D mesh that is projected into the virtual 3D space such that the primitives of the virtual 3D mesh are positioned within the virtual 3D space to virtually represent surfaces of one or more objects included in the captured 3D scene. In certain examples, the projection of the vertices of a 2D input mesh within a virtual 3D space includes transforming 2D captured imagery (e.g., 2D color data and/or depth data received by rendering facility 102) into a 3D world coordinate system associated with the virtual 3D space (e.g., using a transformation matrix included in metadata received by rendering facility 102).

Figure 3:
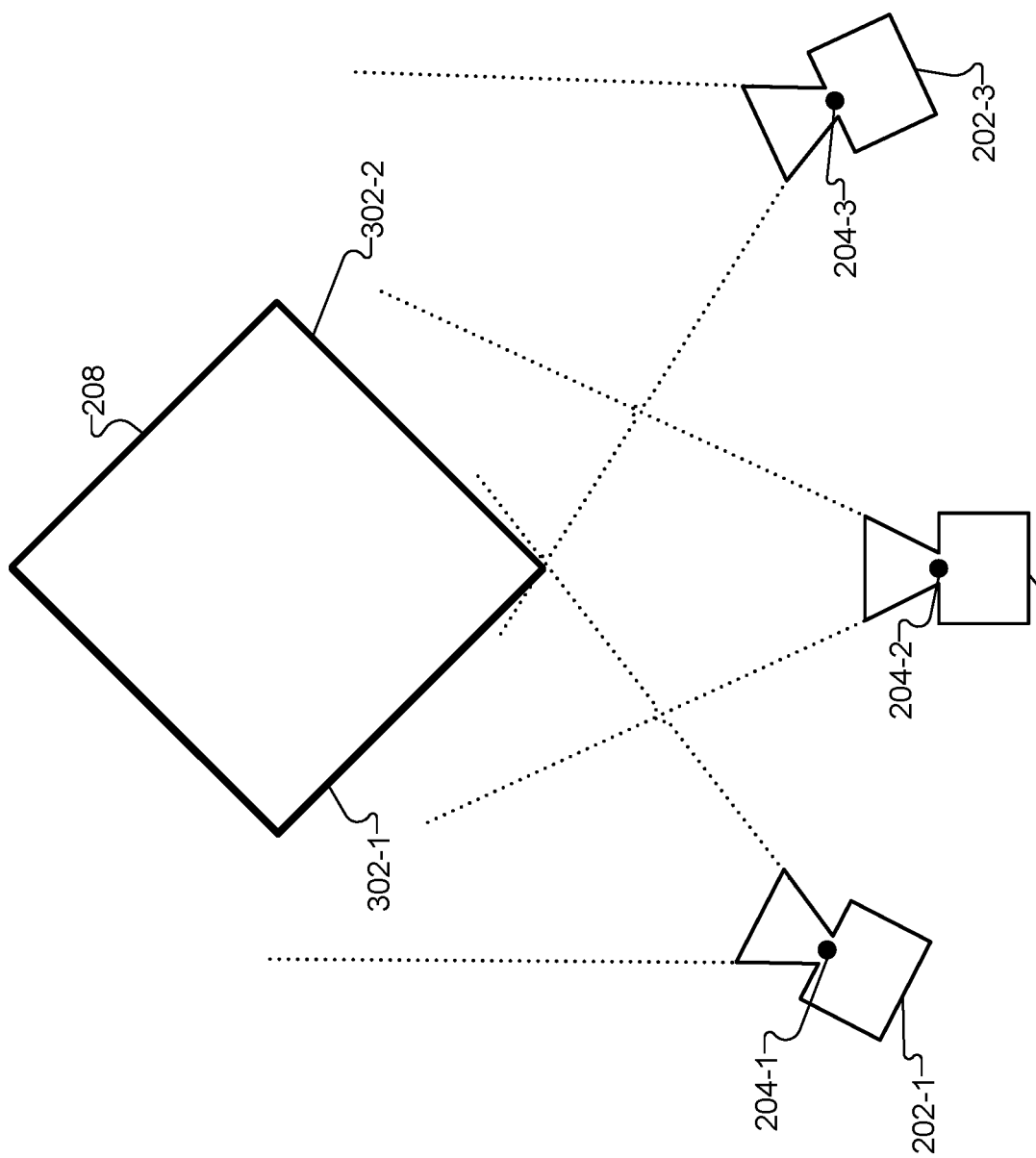
FIG. 3 illustrates an exemplary configuration of capture devices with respect to an object in a 3D scene according to principles described herein.

Examples of rendering facility 102 generating partial 3D meshes will now be described in reference to FIGS. 3-10. FIG. 3 shows capture devices 202-1 through 202-3 disposed at different respective vantage points 204-1 through 204-3 from which capture devices 202-1 through 202-3 may capture depth data and 2D color data associated with certain surfaces 302 (e.g., surfaces 302-1 and 302-2) of object 208 within 3D scene 206. For simplicity of explanation, three capture devices 202 are illustrated in FIG. 3, and FIG. 3 is a cross-sectional view of object 208 within 3D scene 206 in relation to three capture devices 202-1 through 202-3 having three respective vantage points 204-1 through 204-3 relative to object 208. Thus, the relationships between cube 208, capture devices 202, and vantage points 204 are illustrated in two dimensions (e.g., within an x-z plane of 3D scene 206 represented by a x-y-z coordinate system) in FIG. 3. However, it is understood that any number of capture devices 202 may be provided in relation to object 208 and/or 3D scene 206 as may suit a particular implementation, and that principles described in relation to the 2D cross-sectional view apply to 3D relationships between object 208 and capture devices 202 having various vantage points 204.

Figure 4:
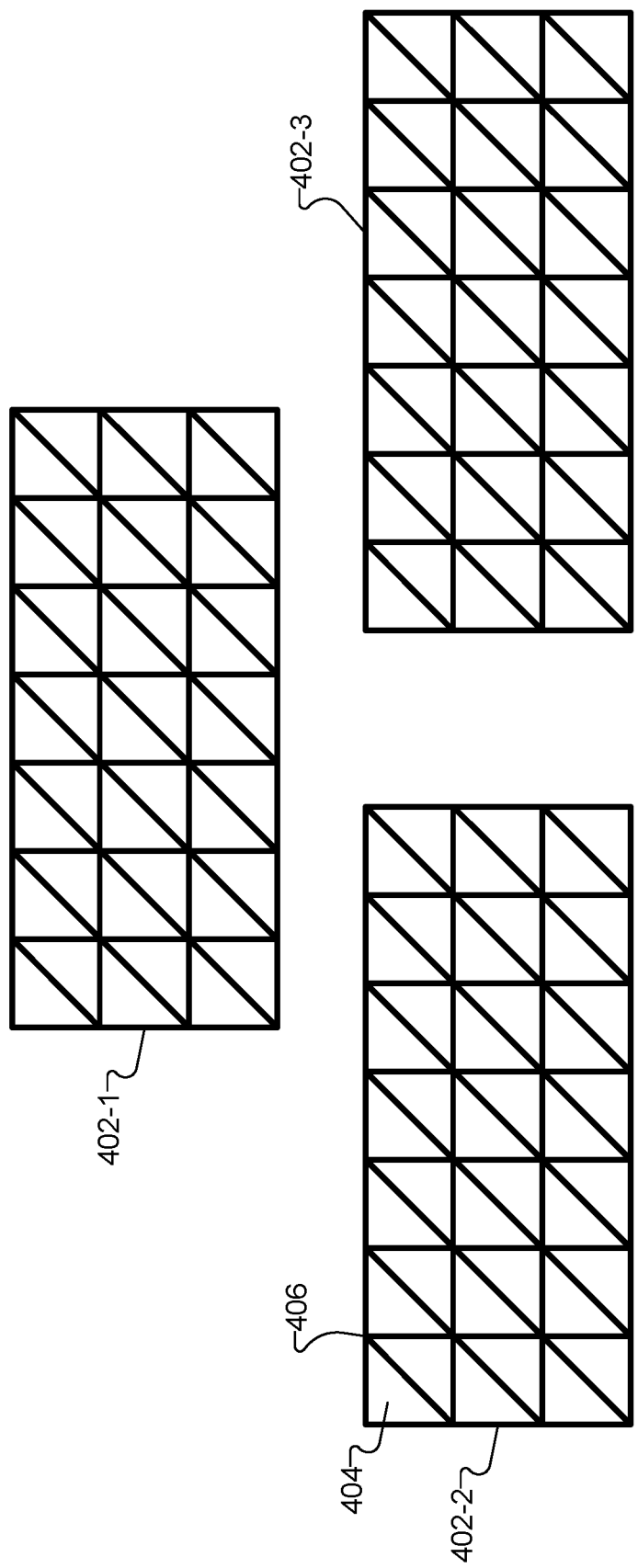
FIG. 4 illustrates exemplary two-dimensional ("2D") input meshes according to principles described herein.

Rendering facility 102 may receive 2D color data and depth data captured by capture devices 202-1 through 202-3, as well as metadata for the 2D color data and depth data, and use the received data to generate a partial 3D mesh for each of the vantage points 204-1 through 204-3 of each of the capture devices 202-1 through 202-3. To generate the partial 3D meshes, rendering facility 102 may generate a 2D input mesh for each of the vantage points 204-1 through 204-3, such as by instantiating each 2D input mesh in memory. FIG. 4 shows exemplary 2D input meshes 402 (e.g., 2D input meshes 402-1 through 402-3) that may be generated by rendering facility 102. In the example shown in FIG. 4, 2D input mesh 402-1 is associated with vantage point 204-1, 2D input mesh 402-2 is associated with vantage point 204-2, and 2D input mesh 404-3 is associated with vantage point 204-3. In the illustrated example, each 2D input mesh is a grid of triangles arranged in a 2D plane, each triangle (e.g., triangle 404) represents a primitive (i.e. a face having a geometric shape), and each point of the triangles represents a vertex (e.g., vertex 406) located at a coordinate (e.g., a normalized coordinate) in the 2D plane. In the example shown in FIG. 4, 2D input meshes 402 are each rectangular in shape with a particular height (e.g., four vertices or three primitives) and a particular length (e.g., eight vertices or seven primitives). However, 2D input meshes may have any suitable aspect ratio, size, and/or shape, and may use any suitable 2D arrangement of vertices and primitives as may suit a particular implementation.

Figure 5:
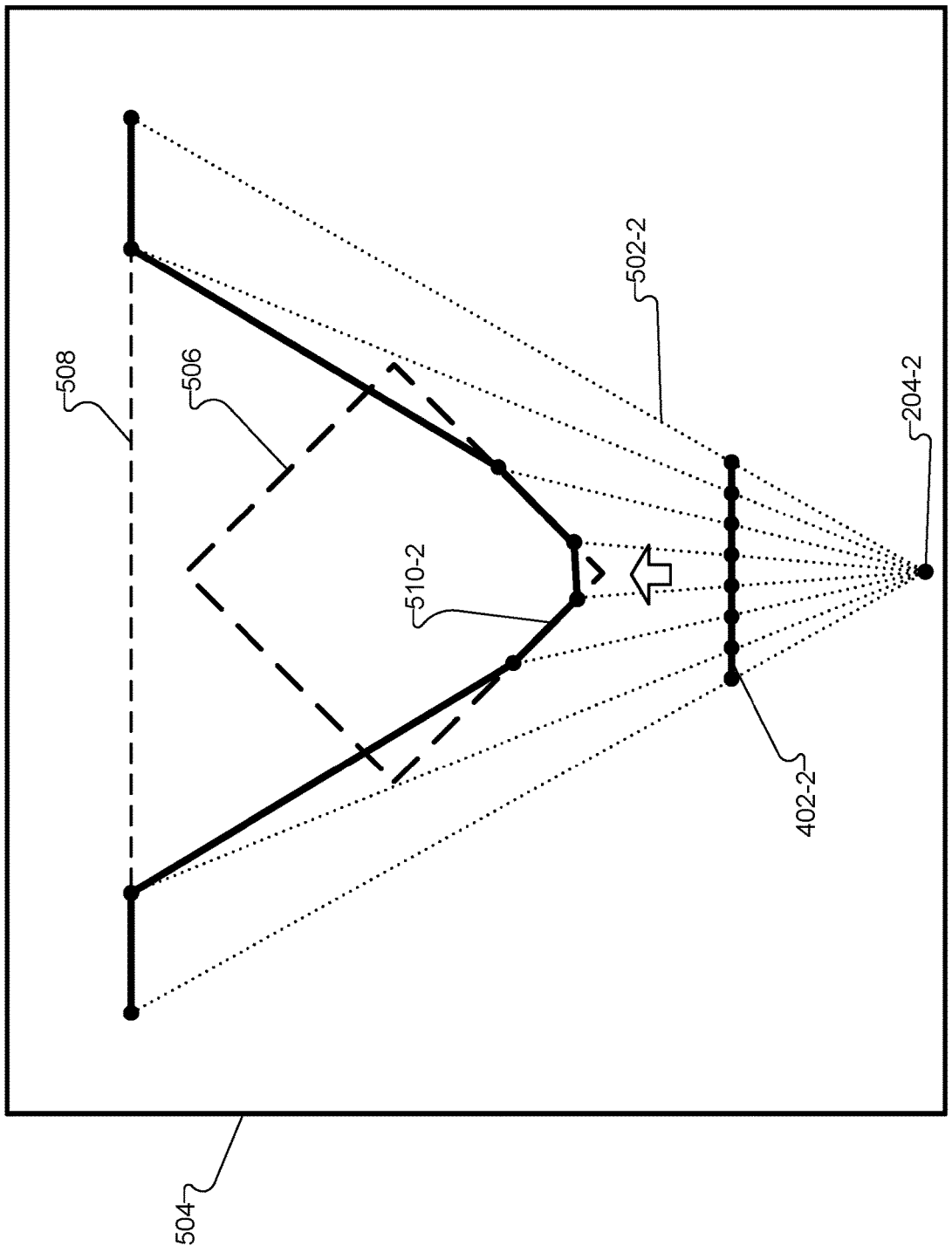
FIGS. 5-7 illustrate exemplary projections of 2D input meshes to depths within a virtual 3D space according to principles described herein.
Figure 6:
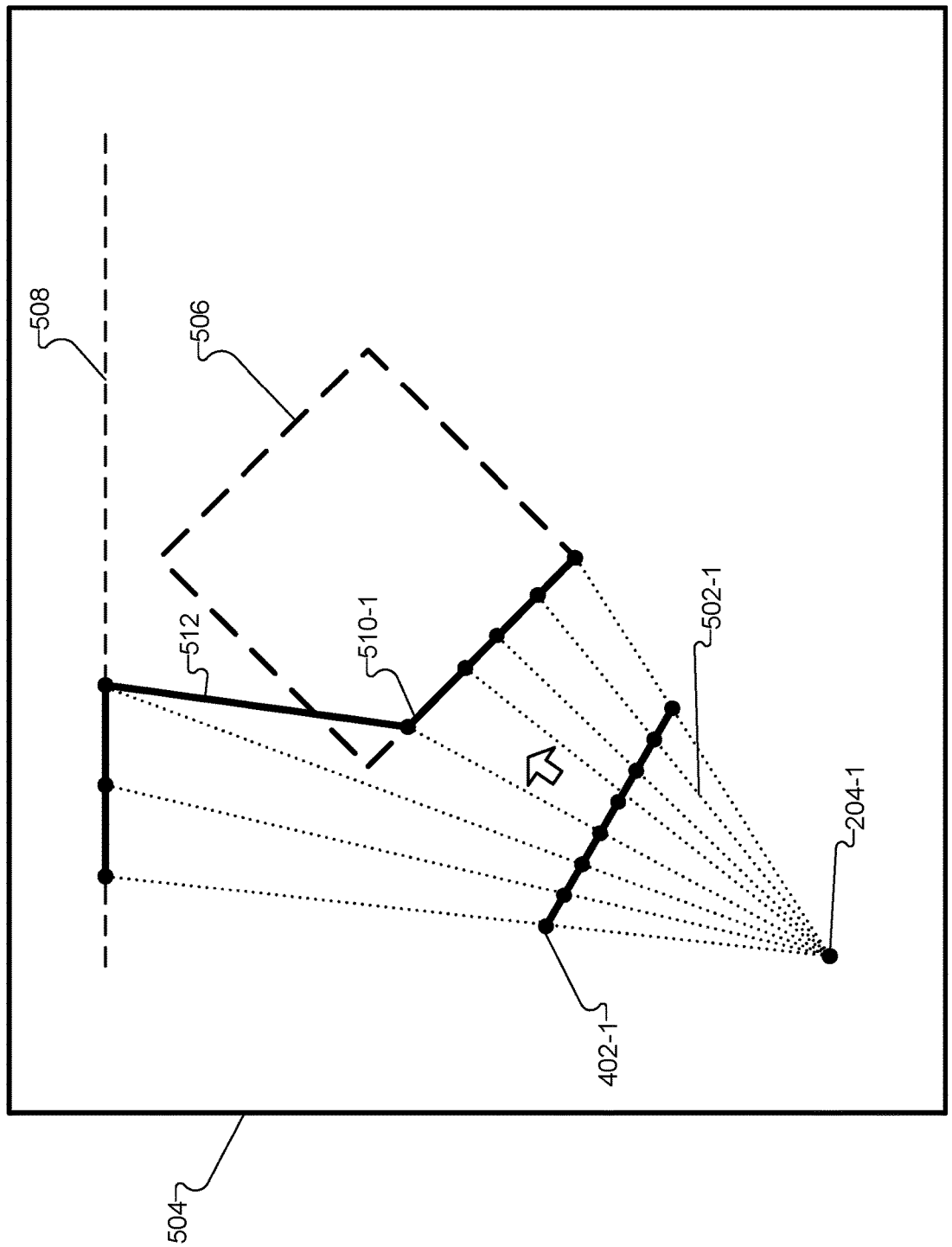
Figure 7:
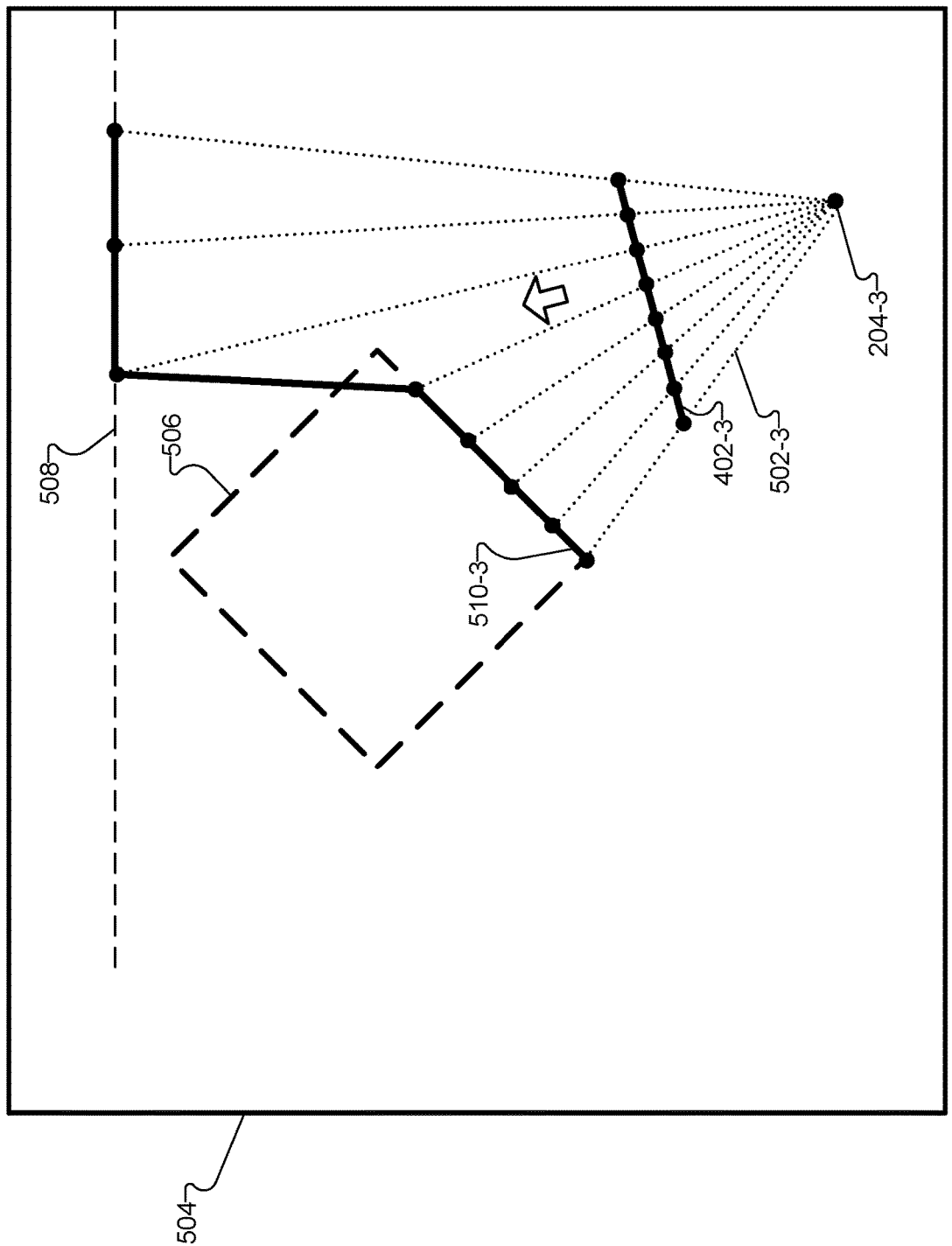

Rendering facility 102 may project a 2D input mesh within a virtual 3D space in any suitable manner. For example, rendering facility 102 may project a 2D input mesh along perspective rays associated the respective vantage point to depths within the virtual 3D space based on the depth data received by rendering facility 102. To illustrate, FIGS. 5-7 show exemplary projections of 2D input meshes 402 (e.g., 2D input meshes 402-1 through 402-3) along perspective rays 502 (e.g., perspective rays 502-1 through 502-3) within a virtual 3D space 504. In the examples shown in FIGS. 5-7, virtual 3D space 504 and 2D input meshes 402 are shown in a cross-sectional view (e.g., a view of an x-z plane of virtual 3D space 504 represented by an x-y-z coordinate system) with each circular dot of 2D input meshes 402 representing a vertex of a 2D input mesh 402. While FIGS. 5-7 illustrate a cross-section of virtual 3D space 504 to be rectangular, this is illustrative only. A virtual 3D space may have any suitable shape.

FIG. 5 shows a projection of 2D input mesh 402-1 along a plurality of perspective rays 502-1 associated with vantage point 204-1 to depths within a virtual 3D space 504 that are represented by depth data captured by capture device 202-1 associated with vantage point 204-1 and received by rendering facility 102. The depth data may represent surfaces of one or more objects included in a captured 3D scene that are within a field of view of and detected by capture device 202-1 from vantage point 204-1. FIG. 5 illustrates a dashed-line representation 506 of object 208 (e.g., a cross-sectional view of a cube) and a dashed-line representation 508 of another object (e.g., a cross-sectional view of a backwall) to represent positions of surfaces of objects within the captured 3D scene. The positions of the surfaces of the objects are represented as captured depth data, and rendering facility 102 may use this depth data to project vertices of 2D input mesh 402-1 to 3D coordinates within virtual 3D space 504 that align with detected positions of surfaces of the objects within the captured 3D scene.

FIG. 6 similarly shows a projection of 2D input mesh 402-2 along a plurality of perspective rays 502-2 associated with vantage point 204-2 to depths within virtual 3D space 504 that are represented by depth data captured by capture device 202-2 associated with vantage point 204-2 and received by rendering facility 102. FIG. 7 similarly shows a projection of 2D input mesh 402-3 along a plurality of perspective rays 502-3 associated with vantage point 204-3 to depths within virtual 3D space 504 that are represented by depth data captured by capture device 202-3 associated with vantage point 204-3 and received by rendering facility 102.

In the examples shown in FIGS. 5-7, the projected 2D input meshes 402 form partial 3D meshes 510 (e.g., partial 3D meshes 510-1 through 510-3) that virtually represent of at least part of surfaces of objects included in the captured 3D scene. Partial 3D meshes 510 include vertices positioned at 3D coordinates in virtual 3D space 504. The vertices positioned at the 3D coordinates define properties of the primitives of the partial 3D meshes (e.g., size, position, orientation, and so forth) such that the vertices and primitives virtually represent, within virtual 3D space 504, locations of surfaces of objects in the capture 3D scene.

The exemplary 2D input meshes 402 and corresponding partial 3D meshes 510 shown in FIGS. 5-7 are provided for illustrative purposes only. It is understood that in practice a cross-section of a 2D input mesh may have many more vertices than the eight vertices shown for each 2D input mesh illustrated in FIGS. 5-7.

As shown in FIGS. 5-7, vertices of a partial 3D mesh may be projected to depths within virtual 3D space 504 that are associated with surfaces of different objects included in the captured 3D scene. For example, in FIG. 5, five of the eight cross-sectional vertices of partial 3D mesh 510-1 are projected to depths associated with a surface of object 208 in the captured 3D scene (represented as dashed-line representation 506 of object 208), while the other three of the cross-sectional vertices of partial 3D mesh 510-1 are projected to depths associated with, for example, a surface of a background wall in the captured 3D scene (represented as dashed-line representation 508 of another object). Similarly, in FIGS. 6 and 7, vertices of partial 3D meshes are projected to depths within virtual 3D space 504 that are associated with surfaces of objects included in the captured 3D scene.

The projection of a 2D input mesh within a virtual 3D space may produce a partial 3D mesh that includes one or more primitives that may not be useful or reliable to generate a partial virtual representation of a captured scene or object in the virtual 3D space. Accordingly, rendering facility 102 may perform one or more operations to identify and remove non-useful and/or unreliable primitives from a partial 3D mesh. Such primitives may be referred to as extraneous primitives and may include any primitives that may not accurately represent a surface of an object of a captured 3D scene with sufficient confidence, which confidence threshold may be defined as may suit a particular application.

As an example, a partial 3D mesh may include one or more primitives that each span a distance between a vertex projected to a surface of one object and a vertex projected to a surface of another object. Such an inter-object primitive may not accurately represent a surface of an object in the captured 3D scene and as such may not be useful to generate a partial virtual representation of the object. FIG. 5, for example, shows that primitive 512 spans a distance from a vertex projected to a surface of a cube object represented by dashed-line representation 506 and a vertex projected to a surface of a backwall object represented by dashed-line representation 508. Accordingly, primitive 512 may not represent a surface of the cube object 208 or of the backwall object. Accordingly, primitive 512 is not useful to generate a partial virtual representation of object 208 or the backwall object within a virtual 3D space.

Rendering facility 102 may perform one or more operations to identify and remove extraneous primitives, such as primitive 512, from partial 3D meshes. Such operations may include rendering facility 102 identifying, for each partial 3D mesh, one or more of the primitives of the partial 3D mesh as extraneous primitives and removing the identified extraneous primitives from each partial 3D mesh. Rendering facility 102 may identify and remove extraneous primitives from a partial 3D mesh in any suitable way, examples of which will now be described.

In certain examples, rendering facility 102 may identify a primitive of a partial 3D mesh as an extraneous primitive based at least in part on the primitive having a depth change that exceeds a predetermined depth change threshold. The predetermined depth change threshold may be determined in advance in any suitable manner and may have any suitable value according to a particular implementation. In certain examples, the predetermined depth change threshold may represent a maximum amount of depth change that a primitive may have and still be considered as representing a surface of an object in a 3D scene.

Figure 8:
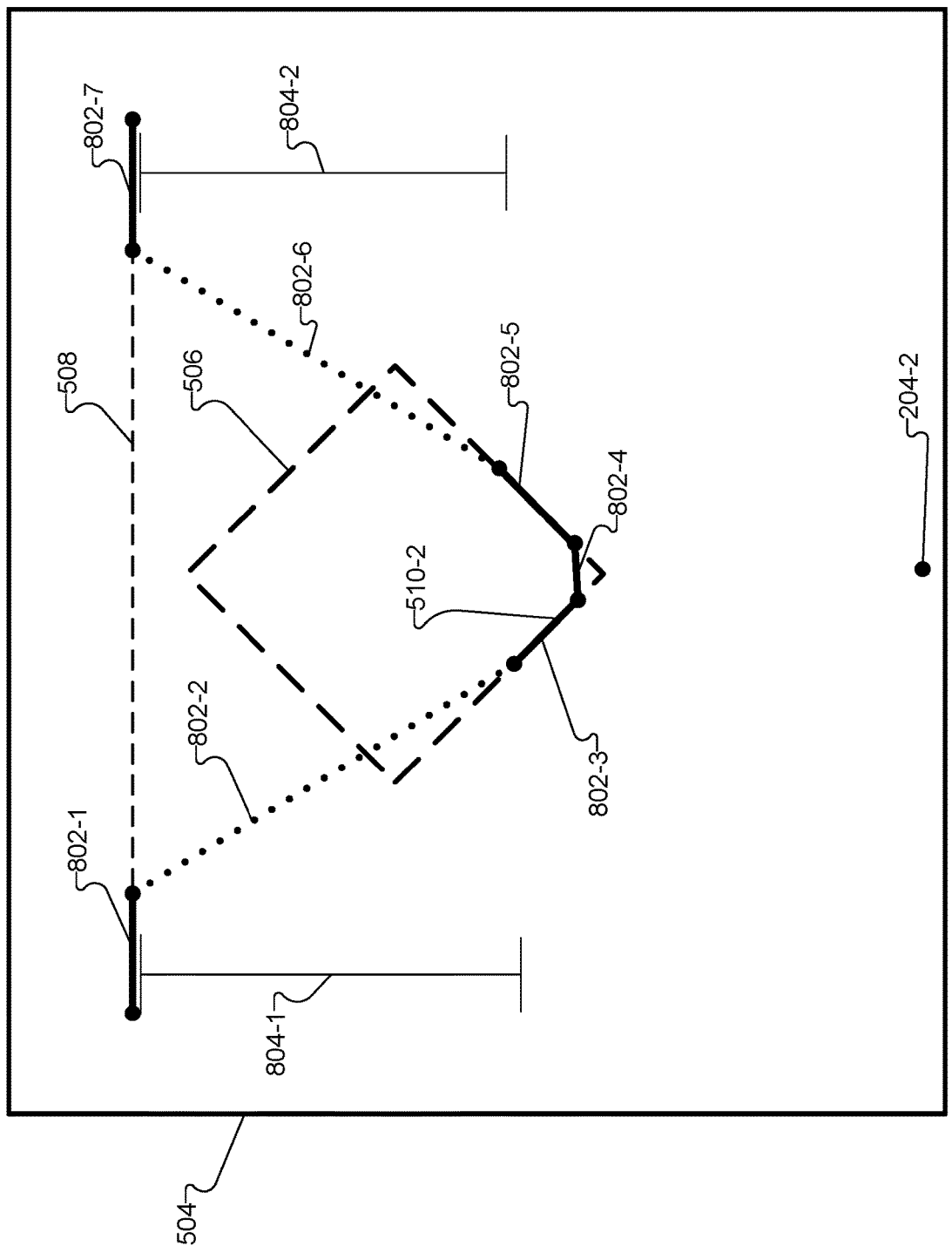
FIGS. 8-10 illustrate exemplary operations for identifying and removing extraneous primitives from a partial 3D mesh according to principles described herein.

FIG. 8 shows an example in which certain primitives included in partial 3D mesh 510-2 have a depth change that exceeds a predetermined depth change threshold. As shown in FIG. 8, partial 3D mesh 510-2 includes primitives 802 (e.g., primitives 802-1 through 802-7). Of primitives 802, primitives 802-2 and 802-6 may each have a respective depth change 804 (e.g., depth changes 804-1 and 804-2) that exceeds a predetermined depth change threshold. Because of depth changes 804, rendering facility 102 may determine that primitives 802-2 and 802-6 do not accurately represent a surface of an object (e.g., object 208 or the backwall object) in the captured 3D scene. Accordingly, rendering facility 102 may identify primitives 802-2 and 802-6 as extraneous primitives and remove primitives 802-2 and 802-6 from partial 3D mesh 510-2 in any suitable manner. Primitives 802-2 and 802-6 are shown in dotted lines in FIG. 8 to indicate that they have been removed by rendering facility 102.

Additionally or alternatively, rendering facility 102 may identify a primitive of a partial 3D mesh as an extraneous primitive based at least in part on the primitive being out of range of a predetermined near plane or a predetermined far plane. Rendering facility 102 may define a predetermined near plane and predetermined far plane in advance in any suitable manner, such as based on metadata (e.g., a depth mapping range included in the metadata), a vantage point, and/or the depth data.

Figure 9:
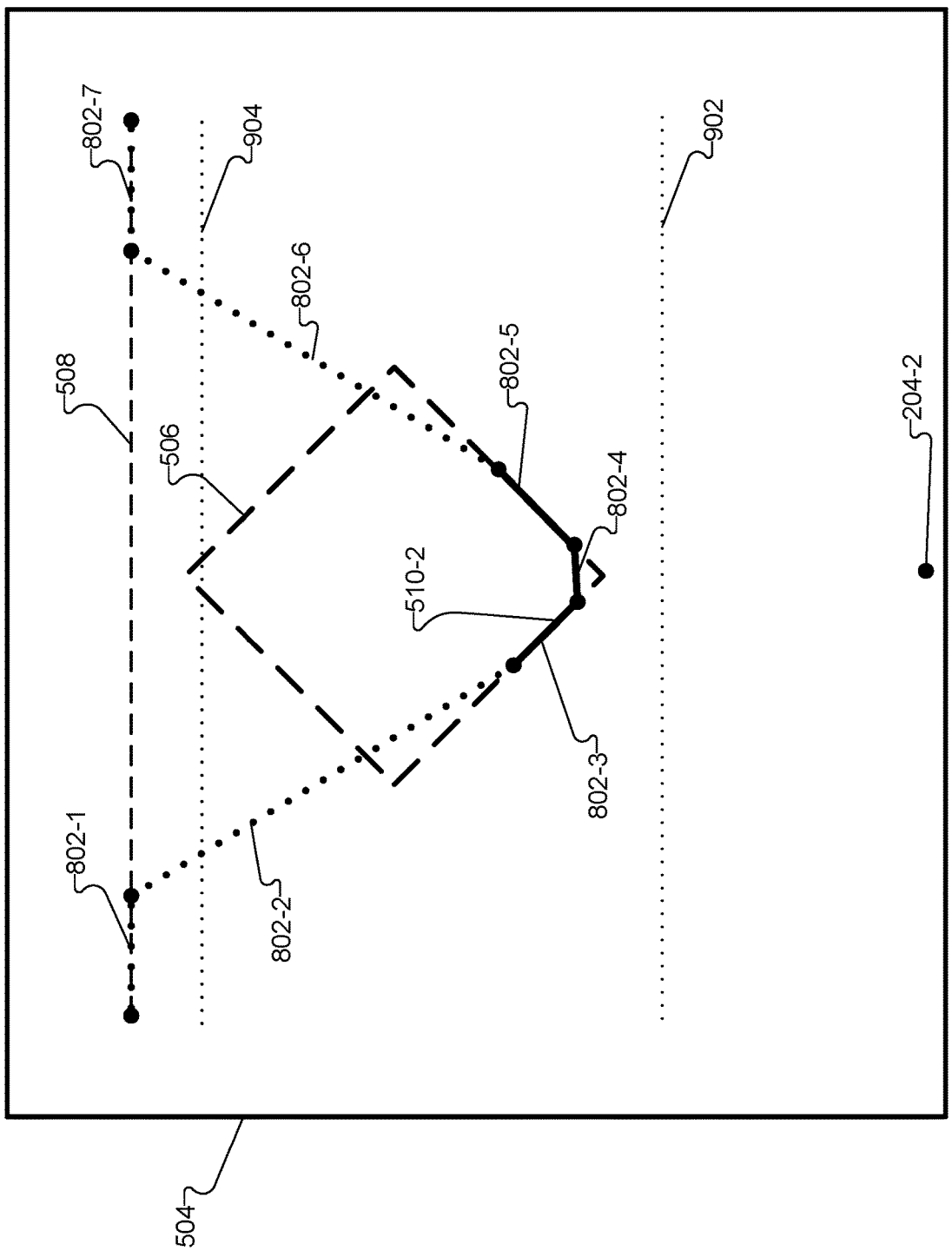

FIG. 9 shows an example in which primitives 802 of partial 3D mesh 510-2 are illustrated in relation to a predetermined near plane 902 and a predetermined far plane 904. In the example shown in FIG. 9, rendering facility 102 may determine that predetermined near plane 902 corresponds to either a depth value of a nearest depth point represented by dashed-line representation 506 or the depth value of the nearest depth point minus some predetermined offset. When all or a portion of a primitive is located between predetermined near plane 902 and vantage point 204-2, rendering facility 102 may determine that the primitive is an extraneous primitive. Similarly, when all or a portion of a primitive is located on or beyond far plane 904 (away from vantage point 204-2), rendering facility 102 may determine that the primitive is an extraneous primitive. In the example shown in FIG. 9, at least a part of primitives 802-2 and 802-6 are located beyond far plane 904. In addition, primitives 802-1 and 802-7 are located entirely beyond far plane 904. Accordingly, rendering facility 102 may determine that primitives 802-1, 802-2, 802-6, and 802-7 are extraneous primitives and may remove them from partial 3D mesh 510-2 in any suitable manner. Primitives 802-1, 802-2, 802-6, and 802-7 are shown in dotted lines in FIG. 9 to indicate that they have been removed by rendering facility 102.

Additionally or alternatively, rendering facility 102 may identify a primitive as an extraneous primitive based at least in part on the primitive having a surface not facing the respective vantage point associated with a partial 3D mesh. Rendering facility 102 may determine whether a primitive has a surface that does not face a respective vantage point in any suitable manner. For example, rendering facility 102 may determine that a primitive does not face a corresponding vantage point based on a relationship between a surface normal of the primitive and a corresponding perspective ray from the corresponding vantage point. For example, rendering facility 102 may perform a cosine-theta or dot-product calculation to determine whether the surface of the primitive faces a respective vantage point. If a result of the cosine-theta or dot-product calculation is a certain value, rendering facility 102 may determine that the surface of the primitive faces away from a vantage point (e.g., in a direction that is orthogonal to a perspective ray of the vantage point). Accordingly, rendering facility 102 may identify such a primitive as an extraneous primitive.

Figure 10:
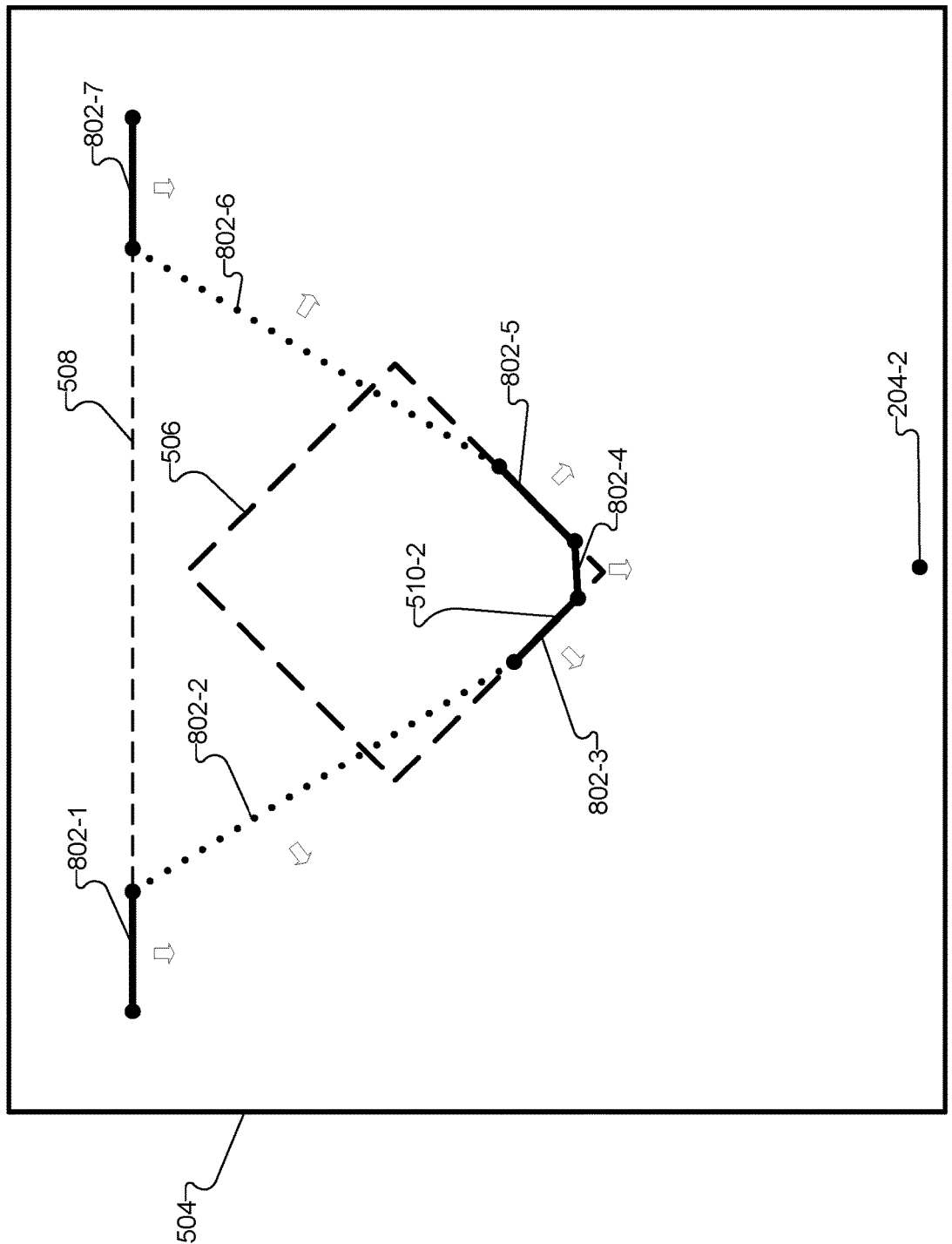

FIG. 10 shows an example in which surface normal arrows are illustrated for each primitive 802 of partial 3D mesh 510-2 to show the directions that surfaces of primitives 802 may face. In the example shown in FIG. 10, rendering facility 102 may perform any suitable calculation to determine that primitives 802-2 and 802-6 have surfaces that do not face vantage point 204-2. Accordingly, rendering facility 102 may identify primitives 802-2 and 802-6 as extraneous primitives and remove them from partial 3D mesh 510-2 in any suitable manner.

In the example described above, rendering facility 102 may determine that a surface of a primitive faces away from the corresponding vantage point if the angle between the corresponding perspective ray and the surface normal for the surface is greater than or equal to an orthogonal angle. In certain other examples, rendering facility 102 may determine that a surface of a primitive does not face a vantage point based on the surface being within a predefined range of being orthogonal with respect to a perspective ray of a corresponding vantage point, as may suit a particular implementation. Accordingly, rendering facility 102 may identify and remove a primitive having a surface that is angled relative to a perspective ray of a vantage point by more than a predetermined angle.

Rendering facility 102 may perform one or more operations, such as those described above, to generate a partial 3D mesh. In certain examples, a generated partial 3D mesh may include all of the primitives produced by projection of a 2D input mesh to depths defined by depth data for a vantage point, as described above. In other examples, a generated partial 3D mesh may include less than all of the primitives produced by projection of a 2D input mesh to depths defined by depth data for a vantage point because one or more of the primitives may be identified as extraneous primitives and removed from the partial 3D mesh, leaving a subset of the primitives as the generated partial 3D mesh. For example, certain primitives 802 have been removed from partial 3D mesh 510-2 shown in FIG. 9 such that only primitives 802-3 through 802-5 remain. Such operations may be performed for any number of partial 3D meshes corresponding to respective vantage points. Accordingly, rendering facility 102 may generate partial 3D meshes, for all or a subset of available vantage points, projected into a virtual 3D space to produce partial virtual representations of one or more objects in a captured 3D scene (e.g., object 208 in 3D scene 206) that may be used by rendering facility 102 to generate an image view of the partial virtual representations in the virtual 3D space from an arbitrary viewpoint within the virtual 3D space.

Rendering facility 102 may generate and use each partial 3D mesh individually, and each partial 3D mesh may represent only a partial virtual representation of a 3D scene. For example, partial 3D mesh 510-2, as illustrated in FIG. 9 to include primitives 802-3, 802-4, and 802-5, only partially represents surfaces of object 208 in 3D scene 206. In this sense, partial 3D mesh 510-2 may be considered a partial mesh as opposed to a single, cohesive mesh for an entire virtual object or virtual 3D world. While rendering facility 102 may generate and use partial 3D meshes individually, because the partial 3D meshes are projected into a common virtual 3D space, collectively the partial 3D meshes may represent all surfaces, or all relevant surfaces, of objects in a captured 3D scene.

Figure 11:
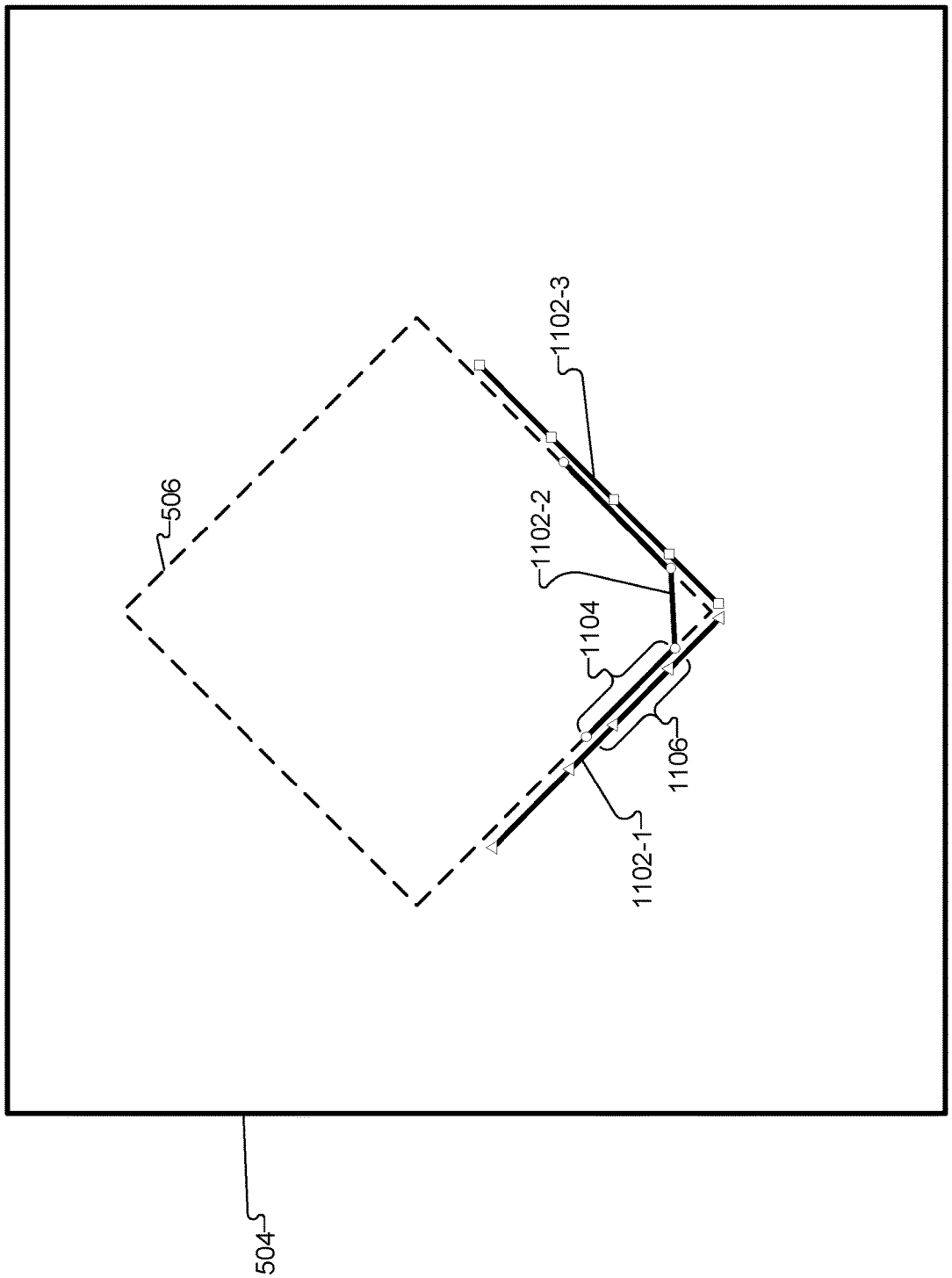
FIGS. 11-12 illustrate cross-sectional views of a plurality of partial 3D meshes projected into virtual 3D space according to principles described herein.

FIG. 11 shows a cross-sectional view of a plurality of partial 3D meshes 1102 (e.g., partial 3D meshes 1102-1 through 1102-3) projected into virtual 3D space 504. In the example shown in FIG. 11, the vertices of each partial 3D mesh 1102 are represented by a different shape indicator than the vertices of the other partial 3D meshes 1102. For example, the vertices of partial 3D mesh 1102-1 are represented by triangle indicators, the vertices of partial 3D mesh 1102-2 are represented by circle indicators, and the vertices of partial 3D mesh 1102-3 are represented by square indicators. The vertices are represented by different shapes in FIG. 11 to distinguish between the partial 3D meshes 1102 and to illustrate that each partial 3D mesh 1102 is an individual, separate partial 3D mesh.

In addition, partial 3D meshes 1102 are shown in FIG. 11 as being adjacent to one another and not lining up on top of one another for clarity of illustration. It is understood that in practice partial 3D meshes 1102 may line up on top of one another and with dashed-line representation 506 of object 208 based on one or more of the vertices being projected to same depths within virtual 3D space 504 based on the depth data representative of positions of surfaces of object 208 in the captured 3D scene 206. For example, while partial 3D meshes 1102-1 and 1102-3 are shown to be positioned slightly in front of partial 3D mesh 1102-2 and dashed-line representation 506 of object 208 in FIG. 11, this is for clarity of illustration. In practice, partial 3D meshes 1102-1 and 1102-3 will align more closely with partial 3D mesh 1102-2 and dashed-line representation 506 of object 208.

FIG. 11 illustrates that individual partial 3D meshes may be projected into a common virtual 3D space such that the individual partial 3D meshes are superimposed and may have overlapping sections that share common spatial positions in the virtual 3D space. Sections of partial 3D meshes may be considered overlapping when the sections share common spatial positions in the virtual 3D space. For example, a primitive 1104 of partial 3D mesh 1102-2 and a section 1106 of partial 3D mesh 1102-1 may be overlapping when aligned with common spatial positions representing a surface of object 208 in virtual 3D space 504.

Figure 12:
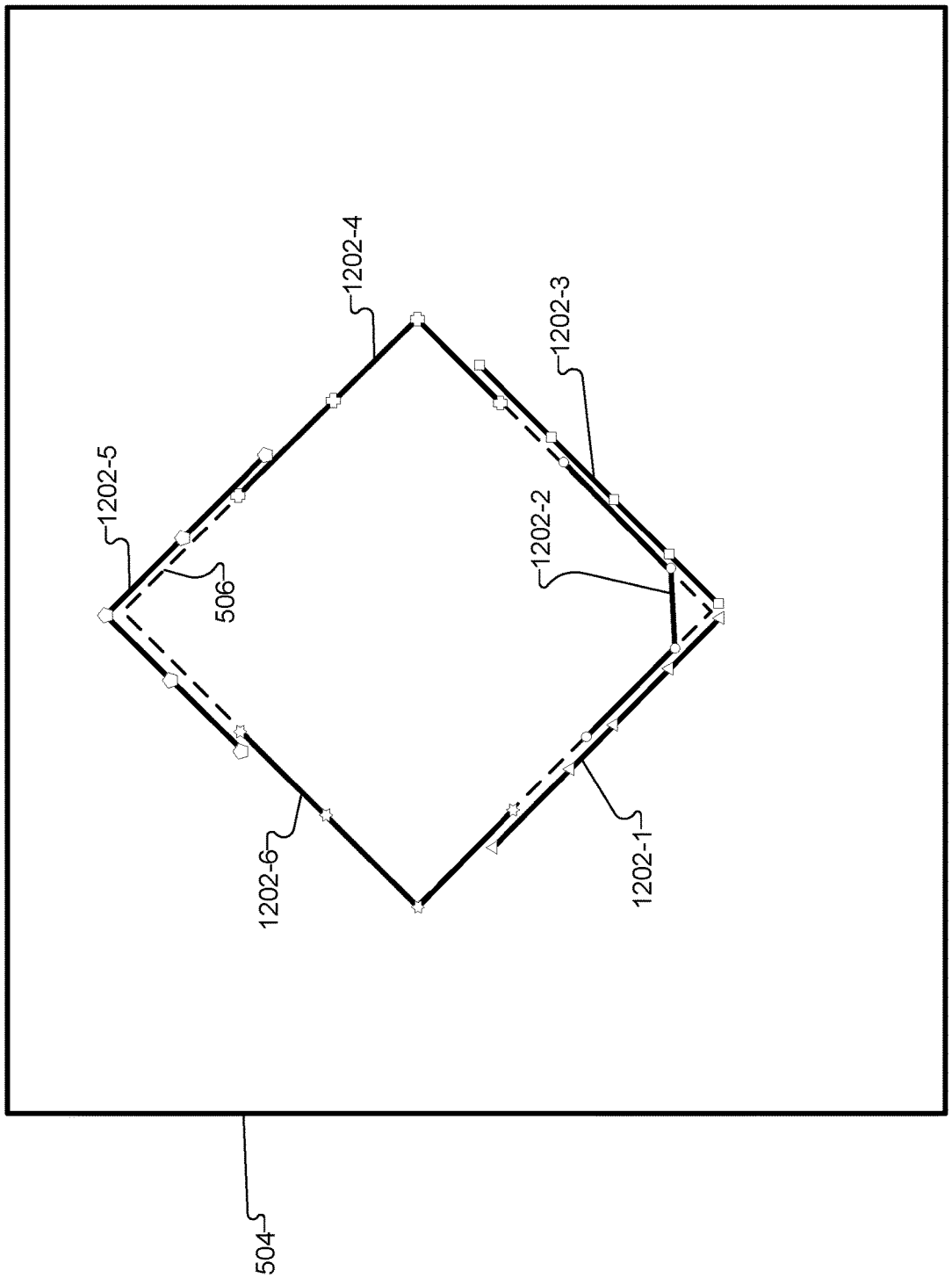

FIG. 11 illustrates three partial 3D meshes 1102-1 through 1102-3 projected into virtual 3D space. Partial 3D meshes 1102-1 through 1102-3 may be partial 3D meshes generated by rendering facility 102 in any of the ways described above based on vantage points 204-1 through 204-3 of capture devices 202-1 through 202-3 in the configuration 200 shown in FIG. 2. However, any suitable number of partial 3D meshes for any suitable of configuration of capture devices having vantage points relative to a 3D scene may be projected into a common virtual 3D space to produce partial virtual representations of the 3D scene in the virtual 3D space. For example, for a configuration in which additional capture devices having additional vantage points relative to object 208 in a 3D scene, rendering facility 102 may generate additional partial 3D meshes, for the additional vantage points, projected into virtual 3D space 504 to virtually represent additional surfaces of object 208 in virtual 3D space 504. To illustrate, FIG. 12 shows a cross-sectional view of a plurality of partial 3D meshes 1202 (e.g., partial 3D meshes 1202-1 through 1202-6) projected into virtual 3D space 504. FIG. 12 is similar to FIG. 11 except that FIG. 12 shows six partial 3D meshes 1202 associated with six vantage points projected into virtual 3D space 504.

In certain examples, rendering facility 102 may generate partial 3D meshes projected into a common virtual 3D space for all available vantage points relative to a captured 3D space. In other examples, rendering facility 102 may generate partial 3D meshes projected into a common virtual 3D space for only a subset of all available vantage points relative to a captured 3D space. Rendering facility 102 may generate partial 3D meshes for only a subset of available vantage points because rendering facility 102 receives data for only a subset of available vantage point or because rendering facility 102 may select and process data for a subset of the most preferred vantage points, such as the vantage points that provide the most reliable data for an arbitrary viewpoint in the virtual 3D space.

Rendering facility 102 may use generated partial 3D meshes projected into a virtual 3D space to generate an image view of the virtual 3D space from an arbitrary viewpoint within the virtual 3D space. Because the partial 3D meshes projected into the virtual 3D space produce partial virtual representations of a captured 3D scene (i.e., partial virtual reconstructions of one or more objects in the 3D scene), as described above, the image view may represent a perspective view of the partial virtual representations of the 3D scene from any arbitrary viewpoint within the virtual 3D space. The generated image view may be represented in any suitable way, including as data (e.g., data representative of fragments) mapped (e.g., rasterized) from 3D coordinates in virtual 3D space 504 to a set of 2D image coordinates in an image plane such that the data may be used to generate and output display screen data (e.g., pixel data) representative of the image view for display on a 2D display screen.

Rendering facility 102 may generate an image view of the virtual 3D space from an arbitrary viewpoint within the virtual 3D space by accumulating partial 3D meshes projected into the virtual 3D space and blending color samples for the partial 3D meshes to form the image view of the virtual 3D space. In certain examples, rendering facility 102 may accumulate the partial 3D meshes in a frame buffer of a GPU and additively blend color samples for the partial 3D meshes in the frame buffer of the GPU. In certain examples, the blending of color samples for partial 3D meshes may include rendering facility 102 determining blend weights for primitives of the partial 3D meshes, weighting the color samples for the partial 3D meshes based on the determined blend weights for the primitives of the partial 3D meshes, and determining weighted averages of the weighted color samples for superimposed primitives included in overlapping sections of the partial 3D meshes. In certain examples, rendering facility 102 may determine an accumulation region and accumulate and blend only primitives or fragments that are located within the accumulation region. Examples of such operations for generating an image view of a virtual 3D space from an arbitrary viewpoint within the virtual 3D space based on partial 3D meshes projected into the virtual 3D space will now be described.

Figure 13:
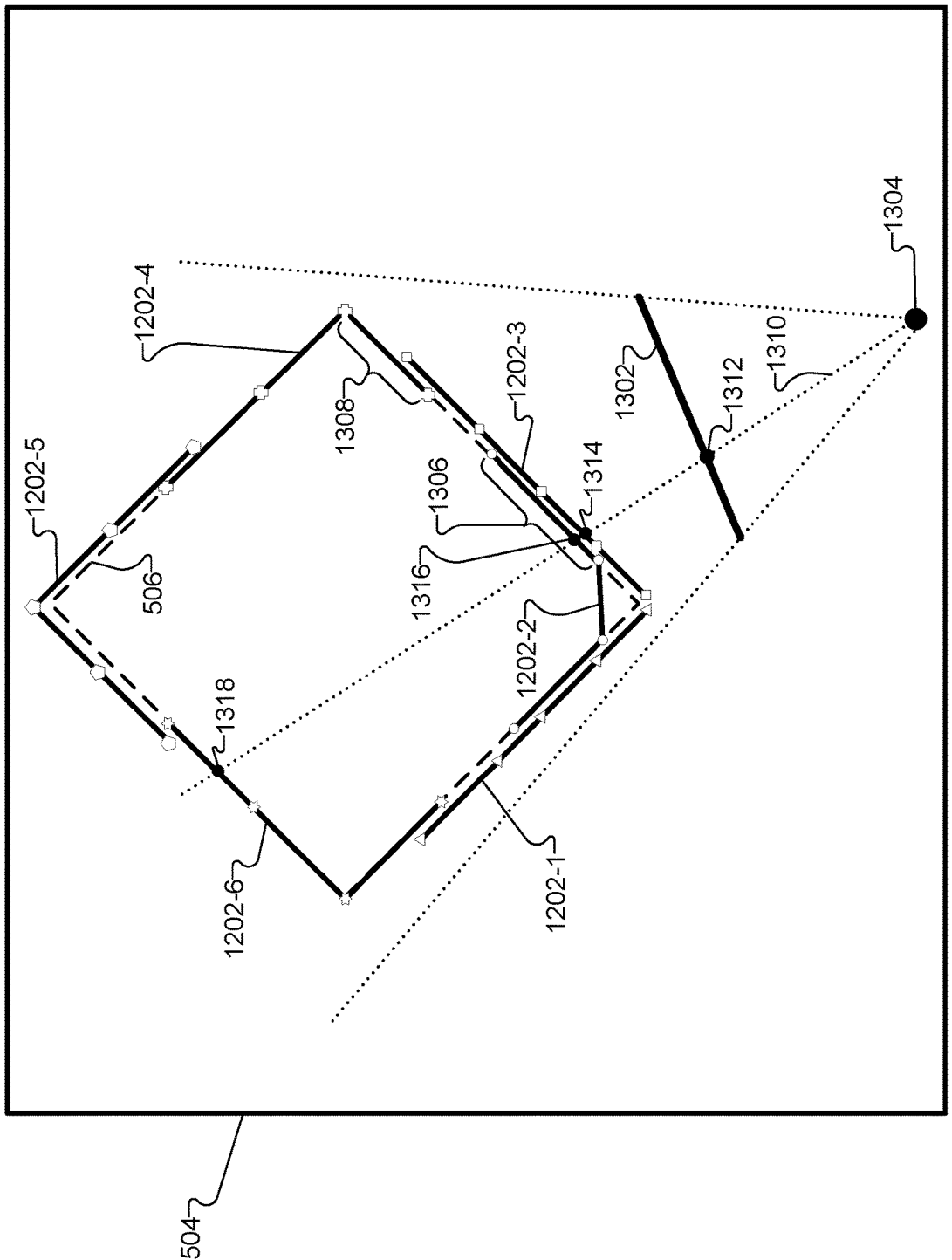
FIG. 13 illustrates a cross-sectional view of partial 3D meshes projected into a virtual 3D space and that may be used to generate an image view of the virtual 3D space from an arbitrary viewpoint according to principles described herein.

FIG. 13 illustrates a cross-sectional view (e.g., a view of an x-z plane of virtual 3D space 504) of partial 3D meshes 1202 projected into virtual 3D space 504 and that may be used by rendering facility 102 to generate an image view 1302 of virtual 3D space 504 from an arbitrary viewpoint 1304 in virtual 3D space 504. In FIG. 13, image view 1302 is represented as a cross-sectional view of a 2D image plane in virtual 3D space 504 and onto which a perspective view of virtual 3D space 504 may be projected from arbitrary viewpoint 1304.

To generate image view 1302, rendering facility 102 may accumulate data representative of partial 3D meshes 1202 projected in virtual 3D space 504 into a frame buffer in which data representative of image view 1302 is written. The frame buffer may be any buffer, such as a buffer of a GPU, capable of storing data samples from accumulated partial 3D meshes. In certain examples, the frame buffer may be a high-precision frame buffer such as a frame buffer configured to store 16-bit float type data or any other data type suitable for high dynamic range video or image format. In other examples, the frame buffer may be configured to store any other data type that may be used for any suitable image and/or video format.

Rendering facility 102 may accumulate partial 3D meshes 1202 into the frame buffer in any suitable way, including by sampling data for the partial 3D meshes to select which data to write to the frame buffer, writing selected data to the frame buffer, and not writing unselected data to the frame buffer. To this end, rendering facility 102 may perform one or more operations to select which data to write or not write to the frame buffer, such as operations for determining occlusion within virtual 3D space 504, determining directions that surfaces represented by partial 3D meshes 1202 face, depth testing, and so forth. Using such operations, rendering facility 102 may determine which data from partial 3D meshes 1202 virtually represents a surface of an object that is visible from arbitrary viewpoint 1304 and may select and write that data to the frame buffer.

To illustrate, from arbitrary viewpoint 1304 in FIG. 13, primitives of partial 3D meshes 1202 that virtually represent a front-right surface of object 208 in virtual 3D space are visible and thus included in image view 1302. As shown, such primitives include one primitive of partial 3D mesh 1202-2 (labeled as primitive 1306), all primitives of partial 3D mesh 1202-3 (not labeled with individual reference numbers), and one primitive of partial 3D mesh 1202-4 (labeled as primitive 1308). In this example, rendering facility 102 may perform operations to identify these primitives as visible from arbitrary viewpoint 1304 and to write data representative of these primitives to the frame buffer. Rendering facility 102 may also perform operations to identify other primitives as not visible from arbitrary viewpoint 1304 and to not write data representative of these other primitive to the frame buffer, which may include never writing the data representative of non-visible primitives to the frame buffer and/or overwriting data representative of non-visible primitives that has already been written to the frame buffer with data representative of the primitives identified to be visible from arbitrary viewpoint 1304, depending on an order in which rendering facility 102 samples (e.g., depth tests) data from partial 3D meshes 1202.

In certain examples, rendering facility 102 may sample data from all partial 3D meshes 1202 projected into virtual 3D space 504 in any order and write data representative of selected primitives to the frame buffer such that after all partial 3D meshes 1202 have been sampled, the frame buffer includes data only for primitives of partial 3D meshes that are visible from arbitrary viewpoint 1304. In other examples, rendering facility 102 may select a subset of partial 3D meshes 1202 projected in virtual 3D space 504 that are most relevant to arbitrary viewpoint 1304, based on any suitable defined criteria and operations, and sample data only for the selected partial 3D meshes 1202.

Because rendering facility 102 may accumulate partial 3D meshes 1202 that have overlapping sections associated with common 3D coordinates in virtual 3D space 504, rendering facility 102 may select multiple primitives or samples, from multiple partial 3D meshes 1202, for a common 3D coordinate in virtual 3D space 504 to be mapped to a common 2D coordinate of the image view 1302 as represented in the frame buffer. For such overlapping sections of partial 3D meshes 1202, rendering facility 102 may perform one or more operations to accumulate and blend color samples for the overlapping sections of partial 3D meshes 1202 in the frame buffer. In certain examples, rendering facility 102 uses additive blending to blend the color samples such that samples of partial 3D meshes 1202 may be written to the frame buffer as the samples are sampled and selected to be written, for any order of processing of partial 3D meshes 1202.

An example of rendering facility 102 accumulating and blending samples from partial 3D meshes for a single 2D coordinate point of image view 1302 will now be described. FIG. 13 shows an exemplary perspective ray 1310 projected from arbitrary viewpoint 1304 into virtual 3D space 504. As shown, perspective ray 1310 intersects image view 1302 at a 3D coordinate point 1312 in virtual 3D space 504, partial 3D mesh 1202-3 at a 3D coordinate point 1314 in virtual 3D space 504, partial 3D mesh 1202-2 at a 3D coordinate point 1316 in virtual 3D space 504, and partial 3D mesh 1202-6 at a 3D coordinate point 1318. Although 3D coordinate points 1314 and 1316 are shown at different locations in FIG. 13 because partial 3D meshes 1202-2 and 1202-3 are not aligned on top of one another for clarity of illustration as described above, 3D coordinate points 1314 and 1316 are considered to be the same 3D coordinate point or within a predetermined threshold distance of one another so as to be treated as the same 3D coordinate point. 3D coordinate point 1312 on the image plane of image view 1302 corresponds to a 2D coordinate point of the image view 1302 within a set of 2D coordinates used to represent image view 1302 and to which 3D coordinate points 1314, 1316, and 1318 may be mapped by rendering facility 1302 when accumulating data from partial 3D meshes 1202 in a frame buffer.

As an example, rendering facility 102 may sample 3D coordinate point 1314 of partial 3D mesh 1202-3, select the 3D coordinate point 1314 to be written to the frame buffer, and map and write data for the 3D coordinate point 1314 to the 2D coordinate point for the image view 1302 that corresponds to 3D coordinate point 1312 on the image plane of image view 1302. Rendering facility 102 may also sample 3D coordinate point 1318 of partial 3D mesh 1202-6, not select the 3D coordinate point 1318 to be written to the frame buffer because 3D coordinate point 1318 is occluded by 3D coordinate point 1314 already mapped and written to the 2D coordinate point for the image view 1302 in the frame buffer (which occlusion may be determined by depth testing or in any other suitable way), and not write data for the 3D coordinate point 1318 to the 2D coordinate point for the image view 1302. Rendering facility 102 may also sample 3D coordinate point 1316 of partial 3D mesh 1202-2 and select the 3D coordinate point 1316 to be written to the frame buffer because 3D coordinate point 1316 is not occluded by 3D coordinate point 1314 because they represent a common 3D point. Because 3D coordinate point 1316 is the same as 3D coordinate point 1314, as described above, rendering facility 102 may map and write data for the 3D coordinate point 1316 to the 2D coordinate point for the image view 1302 in a way that blends data for the 3D coordinate points 1314 and 1316 such that the frame buffer will include data for the 2D coordinate point that represents a blending of data for 3D coordinate points 1314 and 1316. For example, rendering facility 102 may blend color samples for 3D coordinate points 1314 and 1316 in the frame buffer.

In certain examples, rendering facility 102 may blend color samples for partial 3D meshes by additively blending color samples for common 3D coordinate points on overlapping sections of partial 3D meshes in a frame buffer as rendering facility 102 processes samples. Continuing the example shown in FIG. 13, rendering facility 102 may additively blend color samples for common 3D coordinate points 1314 and 1316 in the frame buffer for a 2D coordinate point in image view 1302 to which 3D coordinate points 1314 and 1316 are mapped. To illustrate, rendering facility 102 may sample 3D coordinate point 1314 of partial 3D mesh 1202-3, select the 3D coordinate point 1314 to be written to the frame buffer, and map and write data for the 3D coordinate point 1314 to the 2D coordinate point for image view 1302. This may include writing color sample data associated with 3D coordinate point 1314 to the frame buffer. For instance, the color sample data for 3D coordinate point in RGB color model value may be (255, 0, 0), and rendering facility 102 may write this value to the frame buffer (e.g., as part of fragment data) for the 2D coordinate point of image view 1302. Rendering facility 102 may also sample 3D coordinate point 1316 of partial 3D mesh 1202-2 and select the 3D coordinate point 1316 to be written to the frame buffer as described above. Because 3D coordinate point 1316 is the same as 3D coordinate point 1314, writing data for the 3D coordinate point 1316 to the 2D coordinate point for the image view 1302 may include writing color sample data associated with 3D coordinate point 1316 to the frame buffer in a way that blends color sample data for the 3D coordinate points 1314 and 1316 such that the frame buffer will include color sample data for the 2D coordinate point that represents a blending of color samples for 3D coordinate points 1314 and 1316. For instance, the color sample data for 3D coordinate point in RGB color model value may be (205, 0, 0), and rendering facility 102 may additively blend this value to the value RGB value for 3D coordinate point 1314 already stored in the frame buffer for the 2D coordinate point of image view 1302. In certain examples, the additive blending may include determining an average of the RGB color values for the 3D coordinate points 1314 and 1316 and writing the determined average (e.g., RGB value (225, 0, 0)) to the frame buffer for the 2D coordinate point of image view 1302.

In certain examples, rendering facility 102 may use weighted blending to blend color samples for partial 3D meshes. For example, the blending of color samples for partial 3D meshes may include rendering facility 102 determining blend weights for primitives of the partial 3D meshes, weighting the color samples for the partial 3D meshes based on the determined blend weights for the primitives of the partial 3D meshes, and determining weighted averages of the weighted color samples for superimposed primitives included in overlapping sections of the partial 3D meshes.

Rendering facility 102 may determine blend weights for primitives of partial 3D meshes in any suitable way. In certain examples, rendering facility 102 may determine a blend weight of a primitive based on a direction that a surface of the primitive faces in relation to a vantage point from which data associated with the primitive is captured, such as a relationship (e.g., an angle) between a surface normal of the surface of the primitive and a perspective ray projected from the vantage point and intersecting the primitive. Such a relationship may represent a level of confidence in or quality of the surface data for the primitive based on an angle of the surface of the primitive relative to the vantage point from which the surface data is captured. For example, a smaller angle between the surface normal of the primitive and a perspective ray projected from a capture vantage point may be indicative of a higher confidence level in the surface data for the primitive than would be indicated by a larger angle between the surface normal of the primitive and a perspective ray projected from a capture vantage point. The smaller angle is indicative of the surface of the primitive more directly facing the capture vantage point compared to a larger angle that is indicative of the surface of the primitive less directly facing the capture vantage point. Accordingly, based on angular relationships between primitive surfaces and capture vantage points, rendering facility 102 may determine a higher blend weight for a first primitive having a surface that more directly faces a capture vantage point and a lower blend weight for a second primitive having a surface that less directly faces a capture vantage point, in order to give more weight to surface data associated with the first primitive than is given to surface data associated with the second primitive. In this or a similar manner, rendering facility 102 may control how primitives influence blending operations based on the level of confidence in the surface data for the primitives, such as by reducing the influence of angled surfaces in blending operations.

Continuing with the example illustrated in FIG. 13, for example, 3D coordinate point 1314 may be on a primitive of partial 3D mesh 1202-3 that has a surface that more directly faces a vantage point (e.g., vantage point 204-3) from which surface data associated with partial 3D mesh 1202-3 is captured, than does the surface of the primitive of partial 3D mesh 1202-2 on which 3D coordinate point 1316 is located with respect to a vantage point (e.g., vantage point 204-2) from which surface data associated with partial 3D mesh 1202-2 is captured. Accordingly, rendering facility 102 may determine a relatively higher blend weight for the primitive associated with 3D coordinate point 1314 on partial 3D mesh 1202-3 and a relatively lower blend weight for the primitive associated with 3D coordinate point 1316 on partial 3D mesh 1202-2, which blend weights may be used by rendering facility 102 to increase the influence of the primitive associated with 3D coordinate point 1314 and decrease the influence of the primitive associated with 3D coordinate point 1316 when color samples for the 3D coordinate points 1314 and 1316 are blended.

Rendering facility 102 may use the determined blend weights for primitives of partial 3D meshes to weight the surface data (e.g., color samples) for the partial 3D meshes and determine weighted averages of the weighted surface data for superimposed primitives included in overlapping sections of the partial 3D meshes. For example, rendering facility 102 may use blend weights for primitives of partial 3D meshes 1202-3 and 1202-2 to weight color samples for 3D coordinate points 1314 and 1316 and to determine a weighted average of the weighted color samples. For instance, rendering facility 102 may multiply a color sample for 3D coordinate point 1314 by a first blend weight determined for the primitive of partial 3D mesh 1202-3 that includes 3D coordinate point 1314, multiply a color sample for 3D coordinate point 1316 by a second blend weight determined for the primitive of partial 3D mesh 1202-2 that includes 3D coordinate point 1316, add the products of the two multiplications, and divide the sum of the products by a sum total of the blend weights to determine a weighted average of the color samples for 3D coordinate points 1314 and 1316 of superimposed primitives included in overlapping sections of partial 3D meshes 1202-3 and 1202-2. Rendering facility 102 may write the determined weighted average of the color samples to the frame buffer for the corresponding 2D coordinate point of image view 1302.

Weighting color samples in this or a similar manner gives relatively more weight to a color sample associated with a more directly captured surface and relatively less weight to a color sample associated with a less directly captured surface. For example, if a weight of 0.7 is determined for a color sample for 3D coordinate point 1314 having RGB value (255, 0, 0) and a weight of 0.3 is determined for a color sample for 3D coordinate point 1316 having RGB value (205, 0, 0), rendering facility 102 may determine a weighted average color sample RGB value of (240, 0, 0) for the blended color samples, which weighted average color sample value may be written in the frame buffer for the corresponding 2D coordinate point as a result of blending the color samples in the frame buffer.

As used herein, writing of data to a frame buffer may include writing data to any suitable frame buffer or configuration of frame buffers that store data for a 2D image view of a virtual 3D space. The data written to the frame buffer may include any data helpful as display data and/or for determining display data (e.g., pixel data) that may be output to a display device and used to display a 2D image view on a 2D display screen or a set of multiple 2D display screens.

Figure 14:
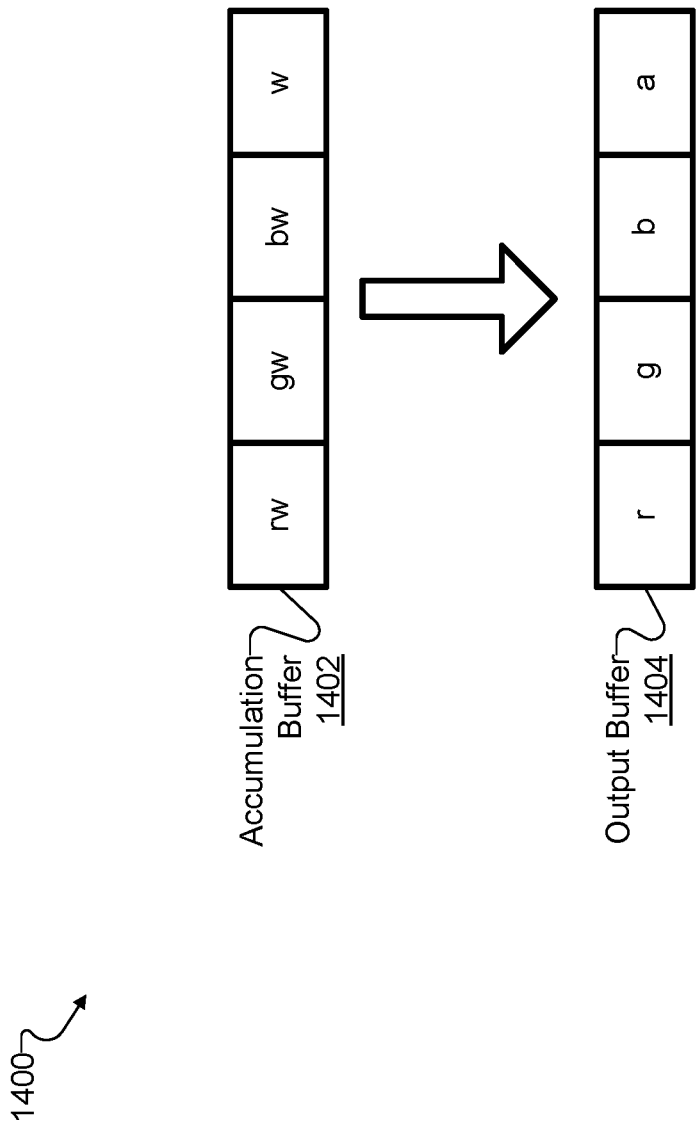
FIG. 14 illustrates an exemplary configuration of frame buffers according to principles described herein.

FIG. 14 illustrates an exemplary configuration 1400 of frame buffers that includes an accumulation buffer 1402 and an output buffer 1404. In certain examples, rendering facility 102 may use accumulation buffer 1402 to accumulate weighted data for partial 3D meshes. To this end, accumulation buffer 1402 may include a set of data for a weighted fragment in which RGB color model values are multiplied by a blend weight "w." Accumulation buffer 1402 may also include data representative of the blend weight "w," which blend weight may be determined by rendering facility 102 as described herein. Rendering facility 102 may accumulate partial 3D meshes in accumulation buffer as described herein, including by adding all weighted fragments for a common 2D coordinate point of an image view. Once all samples have been accumulated in accumulation buffer 1402, rendering facility 102 may divide the sum of the weighted fragments by the sum of blend weights in the accumulation buffer 1402 to determine a weighted average of the fragments for the common 2D coordinate point. Rendering facility 102 may output (e.g., write) the determined weighted average of the fragments to output buffer 1404 (e.g., in RGBA color model format as shown or in any other suitable format), which may be used to provide a display of the 2D image view on a display screen for viewing by a user associated with the display screen.

In FIG. 14, accumulation buffer 1402 is shown to include a set of data for a single 3D coordinate point in virtual 3D space 504 that is mapped to a 2D coordinate point on image view 1302. It will be understood that accumulation buffer 1402 may include additional sets of data for one or more other 3D coordinate points in virtual 3D space 504 that are mapped to the same 2D coordinate point on image view 1302 to allow weighted accumulation and blending of the sets of data for all 3D coordinate points in virtual 3D space 504 that are mapped to the same 2D coordinate point on image view 1302.

In FIG. 14, accumulation buffer 1402 and output buffer 1404 are each shown to include a set of data for a single 2D coordinate point of an image view (e.g., image view 1302). It will be understood that accumulation buffer 1402 and output buffer 1404 may each include the illustrated set of data (and additional data not illustrated in FIG. 14, in certain implementations) for each 2D coordinate point in a 2D array of 2D coordinate points that represent a 2D image view. In certain examples, accumulation buffer 1402 may be a higher-precision buffer than display precision and/or output buffer 1404 to allow for accurate accumulation calculations on data in accumulation buffer 1402. For example, accumulation buffer 1402 may store data in a 16-bit float, 16-bit normalized, or other high dynamic range video or image data type format, and output buffer 1404 may store data in an 8-bit low dynamic range video or image data type format. Accumulation buffer 1402 may function as an intermediary buffer in which data for multiple partial 3D meshes may be accumulated and then output to output buffer 1404 as described herein.

In certain examples, rendering facility 102 may determine an accumulation region and accumulate and/or blend only primitives or fragments that are located within the accumulation region. Rendering facility 102 may determine the accumulation region at any suitable time (e.g., as part of a depth pre-pass) and in any suitable manner, such as based on metadata (e.g., a depth mapping range included in the metadata), an arbitrary viewpoint within the virtual 3D space, and/or the depth data for partial 3D meshes projected into the virtual 3D space. For example, rendering facility 102 may determine, based on the depth data for partial 3D meshes 1202 projected into virtual 3D space 504, that an accumulation region begins at a depth value of a nearest depth point of projected partial 3D meshes 1202 along perspective from an arbitrary viewpoint within virtual 3D space 504. Rendering facility 102 may add a predetermined depth offset value to the determined depth value of the nearest depth point of projected partial 3D meshes 1202 to determine a far end of the accumulation range. The accumulation region may extend from the determined depth value of the nearest depth point in a direction along perspective and away from the arbitrary viewpoint to a depth value of a far depth point that has a depth value equal to the sum of the nearest depth point and the predetermined depth offset value. If the nearest depth point is represented as z0 and the predetermined depth offset is represented as dz, then the far depth point may be represented as z1, where z1=z0+dz, and the accumulation range is [z0, z1] where the depth z is oriented along perspective from the arbitrary viewpoint.

An accumulation region may have any size (i.e., range of depths within a virtual 3D space) as may suit a particular implementation. The size of the accumulation region may be determined by the value of the predetermined depth offset, which may be defined in advance as may suit a particular implementation. For example, the depth offset may be defined to provide a desired level of precision for a 3D scene and/or virtual 3D space.

Figure 15:
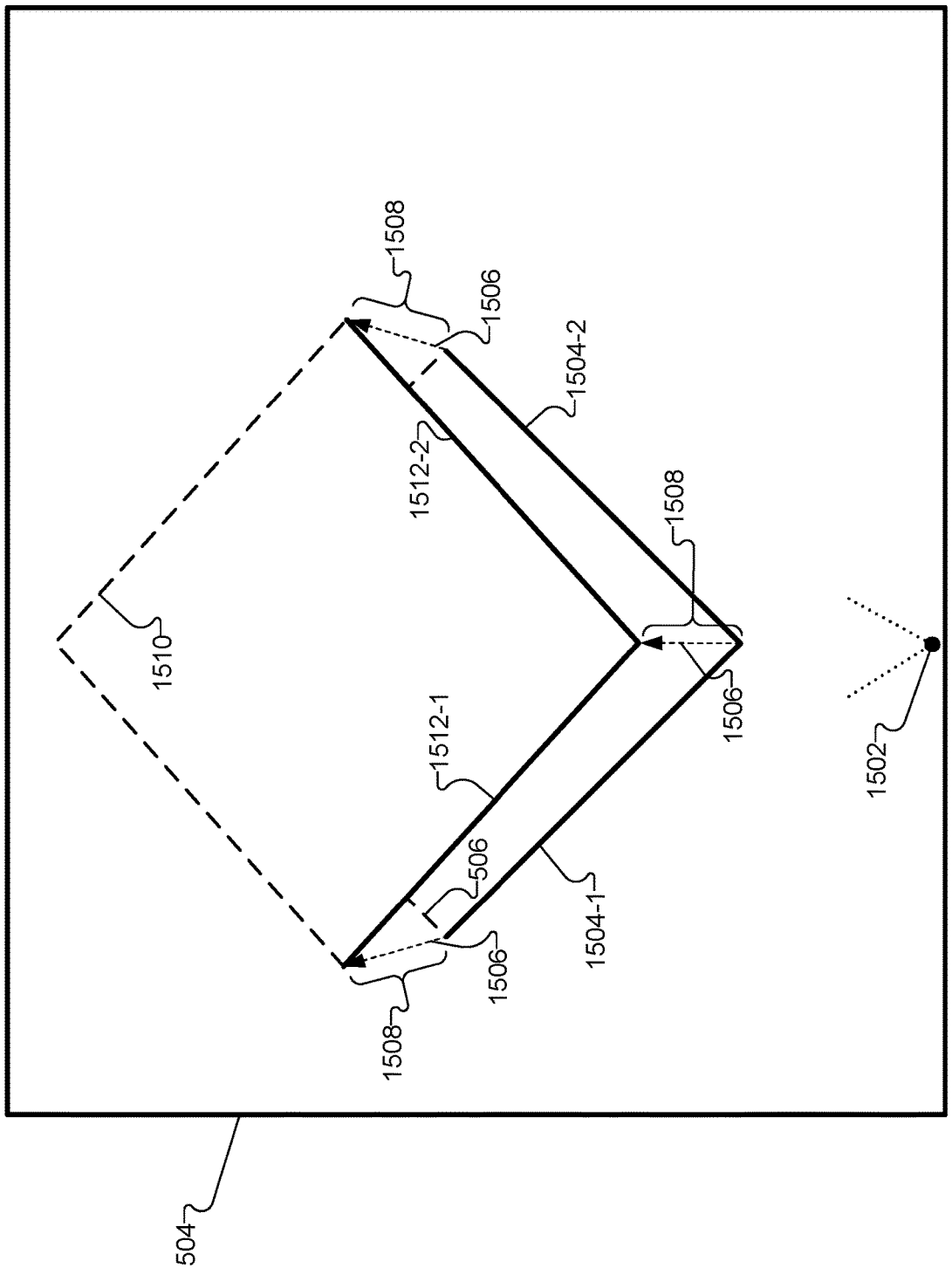
FIG. 15 illustrates an exemplary depth offset of a partial representation of an object to be rendered from an arbitrary viewpoint within a virtual 3D space according to principles described herein.

The depth offset may be used by rendering facility 102 to push back the depth value of each nearest sample of projected partial 3D meshes along perspective from an arbitrary viewpoint in virtual 3D space 504. To illustrate, FIG. 15 shows an exemplary cross-sectional view of dashed-line representation 506 of object 208 in relation to an arbitrary viewpoint 1502 within virtual 3D space 504. In FIG. 15, the front edges of dashed-line representation 506 of object 208 are the nearest depth samples of projected partial 3D meshes to arbitrary viewpoint 1502 and are represented as solid lines 1504-1 and 1504-2. The nearest samples are pushed back along perspective by a depth offset, which depth offset is represented as arrows 1506. By pushing back the nearest samples by the depth offset, rendering facility 102 may determine an accumulation region along each perspective from the arbitrary viewpoint 1502. Examples of accumulation regions 1508 are shown in FIG. 15. In FIG. 15, dashed-line representation 1510 of object 208 represents object in virtual 3D space 504 after rendering facility 102 has performed the depth offset. The front edges of dashed-line representation 1510 of object 208 are the nearest depth samples of projected partial 3D meshes to arbitrary viewpoint 1502 after depth offset and are represented as solid lines 1512-1 and 1512-2. Because rendering facility 102 pushes back the nearest samples along perspective from arbitrary viewpoint 1502, the depth offset may be transparent to a user.

As shown in FIG. 15, accumulation regions 1508 may each span a distance, along perspective from arbitrary viewpoint 1502, from a nearest depth sample value to a depth offset value. Along the perspective from arbitrary viewpoint 1502 associated with each accumulation region 1508, rendering facility 102 may accumulate and blend only primitives or fragments (e.g., color samples for the primitives or fragments) that are located within the respective accumulation region 1508. Accordingly, rendering facility 102 may ignore samples outside of (e.g., beyond) each accumulation region 1508, which may conserve computing resources and/or allow for fast processing of data. Each accumulation region (e.g., each accumulation region 1508) may be considered an accumulation region with respect to an arbitrary viewpoint in a virtual 3D space, or a combination of accumulation regions (e.g., accumulation regions 1508) in a virtual 3D space may be considered an accumulation region for the virtual 3D space with respect to an arbitrary viewpoint.

Projected partial 3D meshes may be superimposed and overlap within a virtual 3D space (e.g., as illustrated in FIGS. 11 and 12). Accordingly, the partial 3D meshes may have different depth values along perspective from an arbitrary viewpoint. Such differences in depth values may occur because of encoding errors, capture errors, and/or any other error associated with the depth data received by rendering facility 102. Rendering facility 102 may correct and/or compensate for such differences in depth values by using a depth offset from a front-most sample to determine an accumulation region and accumulating samples within a determined accumulation region, which allows for samples associated with different depth values within the accumulation region to be sampled and blended together to contribute to an image view from the arbitrary viewpoint.

Figure 16:
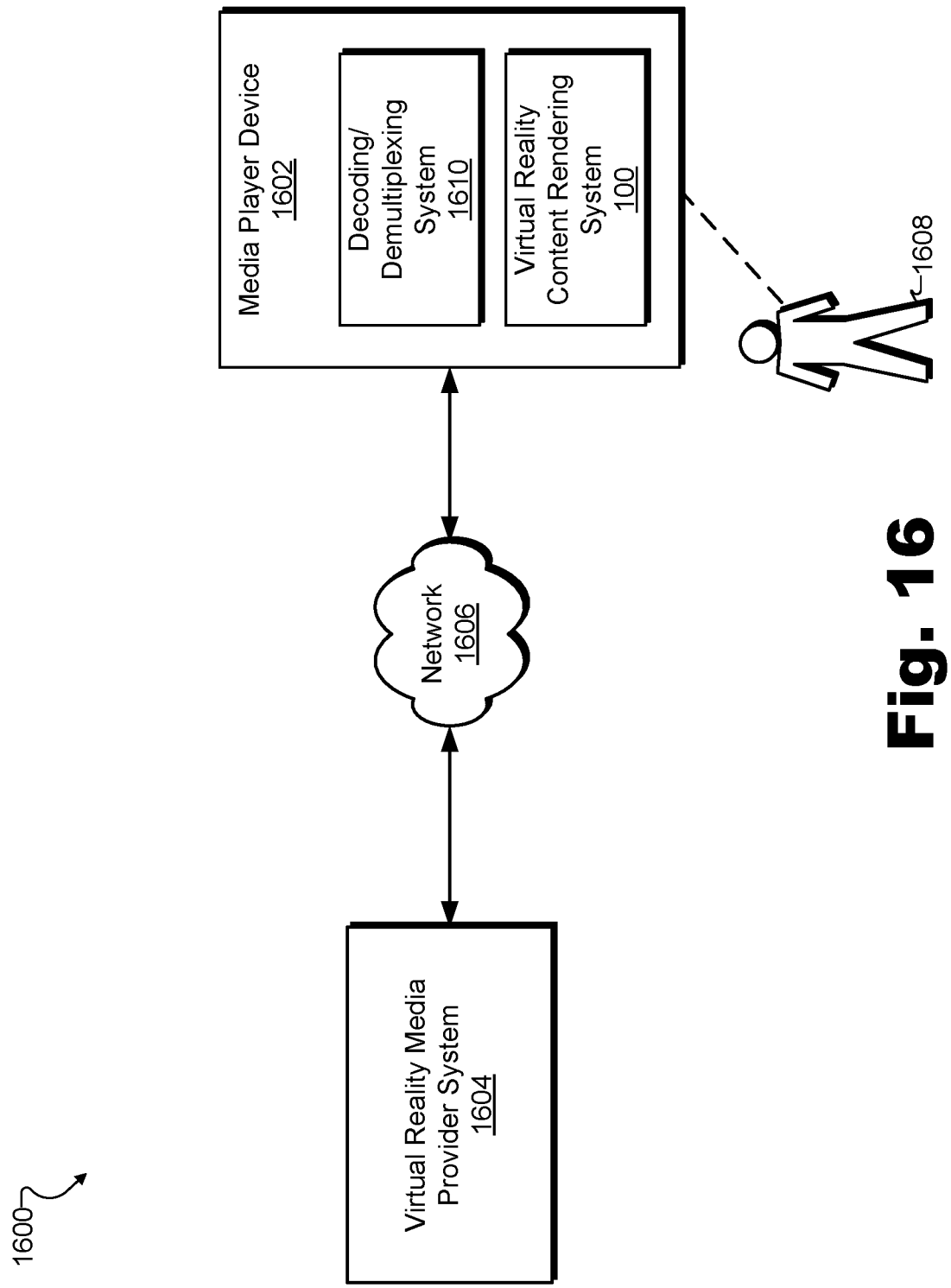
FIG. 16 illustrates an exemplary implementation of the virtual reality content rendering system of FIG. 1 according to principles described herein.

In certain examples, system 100 may be incorporated in a media player device that may receive 2D color data, depth data, and metadata for a captured 3D scene and use the received data to render virtual reality content, as described herein, for presentation to a user of the media player device such that the user of the media player device may experience a virtual reconstruction of the 3D scene from a dynamically selected viewpoint within the virtual reconstruction of the 3D scene. FIG. 16 shows an exemplary implementation 1600 of system 100 in which system 100 is incorporated in a media player device 1602 communicatively coupled to a virtual reality media provider system 1604. Media player device 1602 may be communicatively coupled to virtual reality media provider system 1604 in any suitable manner. In the example shown in FIG. 16, media player device 1602 is communicatively coupled to virtual reality media provider system 1604 by way of a network 1606. However, media player device 1602 may additionally or alternatively be communicatively coupled directly to virtual reality media provider system 1604.

Network 1606 may include any provider-specific wired or wireless network (e.g., a cable or satellite carrier network or a mobile telephone network), the Internet, a wide area network, or any other suitable network. Data may flow between media player device 1602 and virtual reality media provider system 1604 using any communication technologies, devices, media, and protocols as may serve a particular implementation. For example, media player device 1602 and virtual reality media provider system 1604 may communicate using any suitable communication technologies, devices, media, and/or protocols supportive of data communications, including, but not limited to, socket connections, Ethernet, data bus technologies, data transmission media, communication devices, media streaming technologies (e.g., video streaming technologies), Moving Picture Experts Group ("MPEG") protocols, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), WiMax, Time Division Multiple Access ("TDMA") technologies, radio frequency ("RF") signaling technologies, wireless communication technologies (e.g., BLUETOOTH, Wi-Fi, etc.), in-band and out-of-band signaling technologies, and other suitable communications technologies. While only one network 1606 is shown to interconnect virtual reality media provider system 1604 and media player device 1602 in FIG. 2, it will be recognized that these devices and systems may intercommunicate by way of multiple and/or different interconnected networks as may serve a particular implementation.

Virtual reality media provider system 1604 may include any hardware and/or software (e.g., computing systems, software programs, etc.) used for processing 2D captured imagery and metadata. Virtual reality media provider system 1604 may be located at a single location or distributed between multiple devices (e.g., servers) and/or multiple locations as may serve a particular implementation.

Virtual reality media provider system 1604 may provide a data pipeline for delivery of 2D captured imagery and metadata in which the 2D captured imagery and metadata flows from capture devices (e.g., capture devices 202) to virtual reality media provider system 1604 in any suitable manner (e.g., directly or through network 1606) and from virtual reality media provider system 1604 to media player device 1602 by way of network 1606. For example, virtual reality media provider system 1604 may process acquired 2D captured imagery and metadata to generate and provide the 2D captured imagery and metadata in at least one transport stream for streaming to media player device 1602 by way of network 1606.

In certain examples, virtual reality media provider system 1604 may generate and provide 2D captured imagery and metadata to a media player device such as media player device 1602 in any of the ways described in U.S. patent application Ser. No. 15/610,575 titled "Methods and Systems for Using 2D Captured Imagery of a Scene to Provide Virtual Reality Content" and filed the same day as the present application, which application is hereby incorporated by reference herein in its entirety.

In certain examples, virtual reality media provider system 1604 may stream a transport stream to media player device 1602 through any suitable communication channel. Alternatively, virtual reality media provider system 1604 may provide the transport stream to a content delivery network ("CDN") (e.g., a third-party CDN) for streaming to media player device 1602. In certain examples, virtual reality media provider system 1604 may include metadata in the transport stream (e.g., together with 2D captured imagery data (i.e., surface data)) and provide the transport stream for streaming such that the metadata is streamed to media player device 1602 as part of the transport stream. In other examples, virtual reality media provider system 1604 may provide the metadata and the transport stream separately for streaming such that the metadata may be streamed separately from the transport stream.

As used herein, "a transport stream" may refer to a single transport stream into which color video data streams and depth video data streams may be packaged, or to multiple transport streams into which color video data streams and depth video data streams may be packaged. Thus, in certain examples, a transport stream may refer to a single transport stream that carries video data streams for a captured scene (e.g., one color video data stream for each 3D capture device and one depth video data stream for each 3D capture device) as well as any metadata or other suitable data that may be included for transport in a particular implementation. In other examples, a transport stream may refer to a plurality of transport streams that collectively carry video data streams for a captured scene (e.g., one color video data stream for each 3D capture device and one depth video data stream for each 3D capture device) as well as any metadata or other suitable data that may be included for transport in a particular implementation.

A transport stream may include any type of transport stream (e.g., an MPEG transport stream or other type of transport stream) suitable for transporting video and/or other data from virtual reality media provider system 1604 to media player device 1602. A transport stream may be configured in accordance with any suitable data format, container format, and/or transport protocol as may suit a particular implementation.

Figure 17:
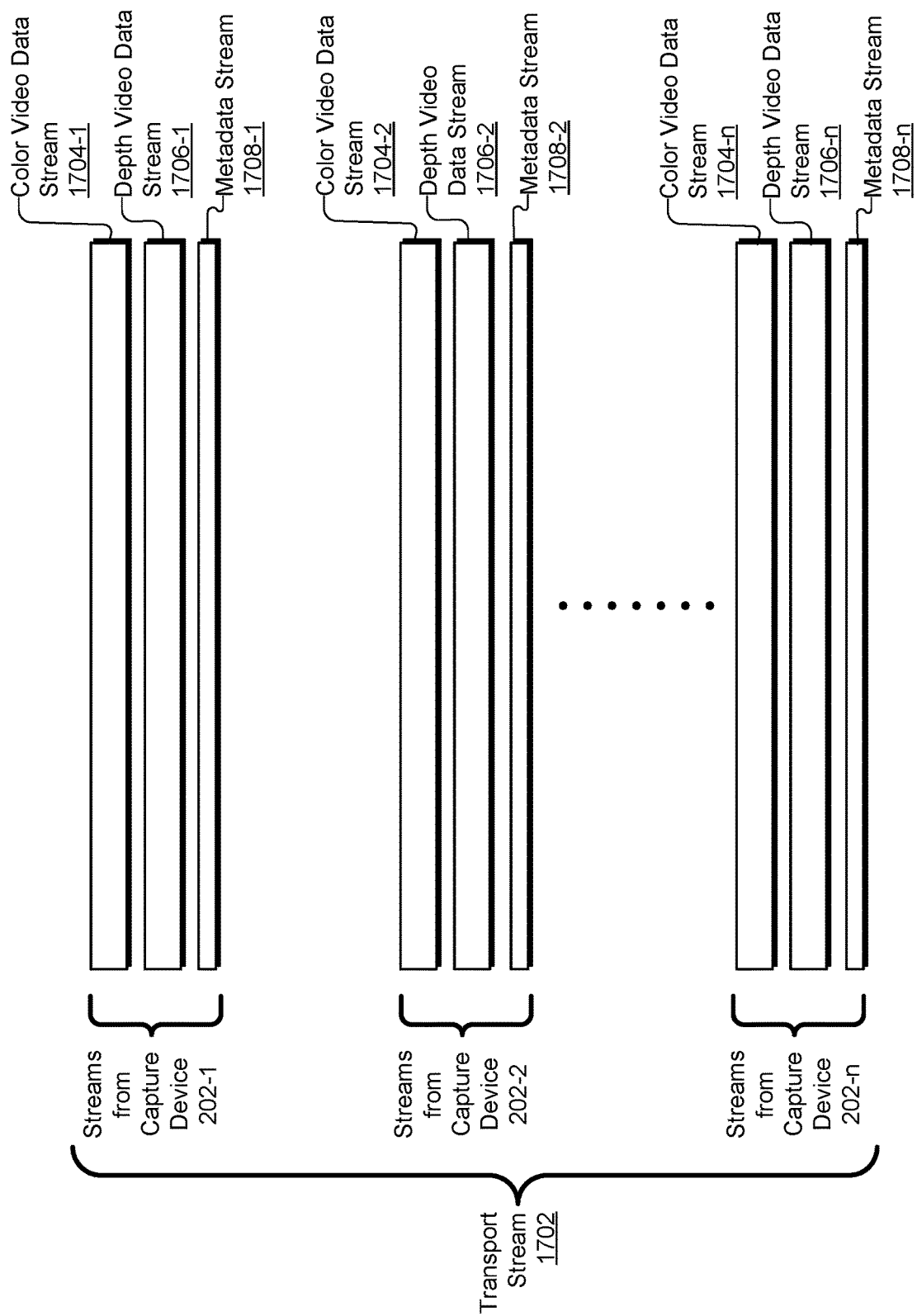
FIG. 17 illustrates an exemplary transport stream that may be received by the virtual reality content rendering system of FIG. 1 according to principles described herein.

FIG. 17 shows an example of a transport stream 1702 in which a color video data stream 1704-1, a depth video data stream 1706-1, and a metadata stream 1708-1 are provided as streams from capture device 202-1, a color video data stream 1704-2, a depth video data stream 1706-2, and a metadata stream 1708-2 are provided as streams from capture device 202-2, and a color video data stream 1704-n, a depth video data stream 1706-n, and a metadata stream 1708-n are provided as streams from capture device 202-n.

Figure 18:
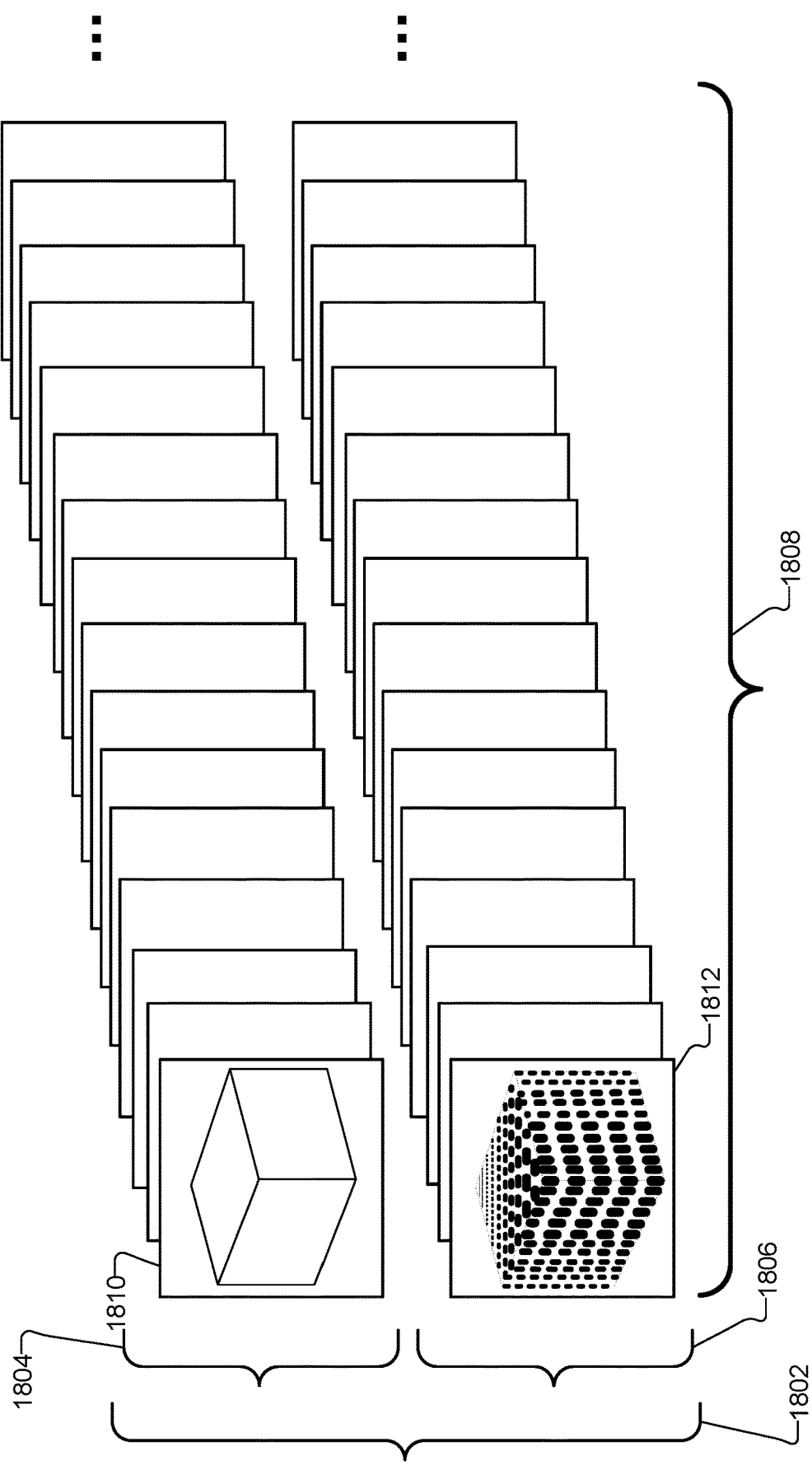
FIG. 18 illustrates exemplary 2D color and depth data that may be received by the virtual reality content rendering system of FIG. 1 from a particular capture device during a particular temporal sequence according to principles described herein.

The 2D captured imagery data transmitted or otherwise provided in a transport stream (e.g., transport stream 1702) to media player device 1602 may be provided as separate color data streams and depth data streams in any suitable manner. To illustrate, FIG. 18 shows exemplary surface data 1802 that may be acquired by virtual reality media provider system 1604 from, for example, capture device 202-2. As shown in FIG. 18, surface data 1802 may include a series of sequential 2D color data captures 1804 (e.g. frames of a color data stream) of 3D scene 206 captured by the capture device 202-2 and a series of sequential 2D depth data captures 1806 (e.g., frames of a depth data stream) of scene 206 captured by capture device 202-2. The series of sequential 2D color data captures 1804 may represent color data of object 208 in 3D scene 206 from vantage point 204-2 of capture device 202-2 during a particular temporal sequence 1808 (e.g., a particular period of real time, a particular virtual timeline associated with 3D scene 206, etc.). The series of sequential 2D depth data captures 1806 may represent depth data of object 208 in 3D scene 206 from vantage point 204-2 of capture device 202-2 during the particular temporal sequence 1808.

FIG. 18 also shows an exemplary 2D color data capture 1810 included in the series of sequential 2D color data captures 1804 and an exemplary 2D depth data capture 1812 included in the series of sequential 2D depth data captures. 2D color data capture 1810 may include color data, which may represent a view of 3D scene 206 (including color data from the surfaces of object 208) visible from vantage point 204-2. While the color data is illustrated as an image in FIG. 18, it will be understood that the color data may be captured, encoded, formatted, transmitted, and represented in any suitable form. For example, the color data may be digital data that is formatted according to a standard video encoding protocol, a standard image format, or the like. The color data may represent a color image (e.g., similar to a color photograph) of the objects included within the 3D scene as viewed from virtual vantage point 204-2. Alternatively, the color data may be a grayscale image representative of the objects (e.g., similar to a black and white photograph).

2D depth data capture 1812 may include depth data for the surfaces of object 208 from a point in space associated with vantage point 204-2. Like the color data, the depth data represented in 2D depth data capture 412 may depict object 208 within 3D scene 206 from the perspective of vantage point 204-2. However, rather than representing the visible appearance of object 208 (i.e., representing in color or grayscale how light interacts with the surfaces of object 208), the depth data may represent the depth (i.e., the distance or position) of points on surfaces of object 208 (e.g., as well as other objects within 3D scene 206) relative to the position of vantage point 204-2. As with the color data, the depth data may be captured, encoded, formatted, transmitted, and represented in any suitable form. For example, as shown, the depth data may be represented by grayscale image data (e.g., six or eight bits for each pixel represented within the depth data). However, rather than representing how visible light reflects from the surfaces of object 208 (i.e., as represented in the color data), the grayscale image of the depth data may represent, for each pixel in the image, how far away the point represented by that pixel is from the position of vantage point 204-2. For example, points that are closer to vantage point 204-2 may be represented with values that represent darker shades of gray (e.g., binary values closer to 0b111111 in the case of a six-bit implementation where 0b111111 represents black). Conversely, points that are farther away from vantage point 204-2 may be represented with values that represent lighter shades of gray (e.g., binary values closer to 0b000000 in the case of the six-bit implementation where 0b000000 represents white).

The metadata provided by virtual reality content provider system 1604 may be formatted in any suitable manner. In certain examples, the metadata may be formatted into a series of sequential metadata captures. Each metadata capture included in the series of sequential projection metadata captures may include metadata associated with a particular capture device at a particular point in time in relation to the 3D scene. In addition, each metadata capture may be synchronized with a corresponding 2D color data capture and a corresponding 2D depth data capture and, as such, may be referred to as metadata for the 2D color data and depth data (e.g., as a metadata capture or frame for synchronized 2D color and depth data captures or frames).

FIG. 19 illustrates an exemplary implementation 1902 of metadata that may be provided by virtual reality content provider system 1604 and received by media player device 1602. Implementation 1902 may adhere to a JSON data format, a binary data format, or any other suitable data format as may serve a particular implementation. FIG. 19 shows exemplary data fields that may be used to define metadata associated with a particular capture device (e.g., capture device 202-1). A brief description of each of the fields shown in FIG. 19 will now be provided.

The field labeled "stream IDs" in the example shown in FIG. 19 may be populated with an identifier for the color video data stream and an identifier for the depth video data stream associated with a particular capture device. The identifiers may be represented using a string type variable or any other suitable data type. The identifiers may be in any suitable format for any suitable type of data stream. For example, for an MPEG transport stream, the identifiers may be packet identifiers ("PIDs") for packets in the MPEG transport stream.

The field labeled "depth mapping" in the example shown in FIG. 19 may be populated with "near" and "far" depth values provided initially by capture facility 106 and representative of a distance (e.g., from the particular capture device) of a minimum value of a representable range of values and a distance (e.g., from the particular capture device) of a maximum value of the representable range of values, respectively. The "near" and "far" depth values may map data values to real-world units and may be represented by floating point values or any other suitable data type and may represent a depth mapping range, such as a depth mapping range bounded by a near plane and a far plane located at the specified depth values. In an embodiment, this may include a more generalized "depth decode" in a format such as $$\begin{bmatrix} zw \\ w \end{bmatrix} = \begin{bmatrix} a & b \\ c & d \end{bmatrix} \begin{bmatrix} z' \\ 1 \end{bmatrix}$$

where z=

$$z = \frac{(az' + b)}{(cz' + d)},$$

and a capture system (e.g., one or more capture devices such as capture devices 202 in FIG. 4) sends the matrix coefficients a, b, c, d.

The field labeled "3×4 column-major transform matrix" in the example shown in FIG. 19 may be populated with a transformation matrix to be used by system 100 to transform data included in the color video data stream and the depth video data stream into 3D coordinates in a common virtual 3D space.

The field labeled "FOV tangent angles" in the example shown in FIG. 19 may be populated with information indicating the field of view or intrinsic capture device parameters, such as those based on focal length, center point, etc., of the particular capture device in terms of view angles or tangents of angles (e.g., $\tan_{left}$, $\tan_{right}$, $\tan_{top}$, and $\tan_{bottom}$). In certain examples, metadata may additionally or alternatively include extrinsic capture device parameters and/or information related to linear and/or non-linear depth disparity associated with capture devices and/or captured surface data.

Implementation 1102 shown in FIG. 11 is illustrative of one way that metadata may be represented and provided to media player device 210 in certain examples. In other examples, metadata may be represented in any other format and may include any additional or alternative information as may be suitable for a particular implementation.

Returning to FIG. 16, media player device 1602 may include or be implemented by any device capable of receiving data representative of 2D color data and depth data and metadata (e.g., in a transport stream) and processing the received data to generate virtual reality content as described herein. Media player device 1602 may generate and use partial 3D meshes such as those described herein to render and present an image view of a virtual 3D space from a selected arbitrary viewpoint within the virtual 3D space, which image view may be a perspective field of view of a virtual 3D space (e.g., a perspective view of a virtual reality world representative of a captured 3D scene). As shown in FIG. 16, media player device 1602 may be operated by a user 1608. Media player device 1602 may detect user input from user 1608 and, based on the user input, dynamically update the image view of the virtual 3D space to be rendered and presented as user 1608 experiences the virtual reality world represented in the virtual 3D space.

For example, a field of view from an arbitrary viewpoint within the virtual reality world may provide an image view through which user 1608 may easily and naturally look around the virtual reality world. The field of view may be presented by media player device 1602 (e.g., on a display screen of media player device 1602) and may include video depicting objects surrounding the viewpoint of user 1608 within the virtual reality world. Additionally, the field of view may dynamically change in response to user input provided by user 1608 as user 1608 experiences the virtual reality world. For example, media player device 1602 may detect user input (e.g., moving or turning the display screen upon which the field of view is presented). In response, the field of view may display different objects and/or objects seen from a different viewpoint (e.g., a viewpoint corresponding to the position of the display screen) in place of the objects seen from the previous viewpoint.

To facilitate user 1608 in experiencing an image view of a virtual 3D space, media player device 1602 may include or be associated with at least one display screen (e.g., a head-mounted display screen built into a head-mounted virtual reality device or a display screen of a mobile device mounted to the head of the user with an apparatus such as a cardboard apparatus) upon which image views of a virtual reality world may be displayed. Media player device 1602 may also include software configured to receive, maintain, and/or process 2D color data and depth data representative of the virtual reality world, together with corresponding metadata, to render and present views of the virtual reality world on the display screen(s) of media player device 1602 in accordance with any of the operations of system 100 described herein. For example, media player device 1602 may include dedicated, standalone software applications (e.g., mobile applications) configured to process and present data representative of a virtual reality world on the display(s). In other examples, the software used to present the particular views of the virtual reality world may include non-dedicated software such as a standard web browser application.

Additionally or alternatively, media player device 1602 may include hardware, firmware, and/or software configured to facilitate receiving, decoding, demultiplexing, and/or processing 2D color data, depth data, and metadata. For example, media player device 1602 may include a decoding/demultiplexing system 1610 that may perform any suitable decoding and/or demultiplexing operations associated with 2D color data, depth data, and metadata received from virtual reality media provider system 1604. In certain examples, decoding/demultiplexing system 1610 may include a graphics card having dedicated video decoding hardware (e.g., one or more dedicated video decoders) and a programmable GPU. The graphics card may include a limited number of decoders capable of decoding received data. Accordingly, in certain examples, data that is received by media player device 1602 (e.g., data included in a transport stream that is received by media player device 1602) may be tailored by virtual reality media provider system 1604 to certain hardware constraints of media player device 1602 (e.g., by limiting the number of streams included in the transport stream).

Decoding/demultiplexing system 1610 may be communicatively coupled to system 100 in any suitable manner. Accordingly, in certain examples, system 100 may receive demultiplexed and/or decoded 2D captured imagery data and projection data from decoding/demultiplexing system 1610 and process the received data as described herein to render virtual reality content. It will be recognized that although systems 100 and 1610 are shown to be separate systems in FIG. 16, systems 100 and 1610 may be combined into fewer systems, such as into a single system, or divided into more systems as may serve a particular implementation.

Media player device 1602 may take one of several different form factors. For example, media player device 1602 may include or be implemented by a head-mounted virtual reality device (e.g., a virtual reality gaming device) that includes a head-mounted display screen, by a personal computer device (e.g., a desktop computer, laptop computer, etc.), by a mobile or wireless device (e.g., a smartphone, a tablet device, a mobile reader, etc.), or by any other device or configuration of devices that may serve a particular implementation to facilitate receiving 2D color data, depth data, and metadata and rendering and presenting virtual reality content. Different types of media player devices (e.g., head-mounted virtual reality devices, personal computer devices, mobile devices, etc.) may provide different types of virtual reality experiences having different levels of immersion for user 1608.

While examples of certain media player devices have been described, the examples are illustrative and not limiting. A media player device may include any suitable device and/or configuration of devices configured to receive 2D color data, depth data, and metadata and use the 2D color data, depth data, and metadata to render an image view of a virtual 3D space according to principles described herein. For example, a media player device may include a tethered device configuration (e.g., a tethered headset device) or an untethered device configuration (e.g., a display screen untethered from a processing device). As another example, a head-mounted virtual reality media player device or other media player device may be used in conjunction with a virtual reality controller such as a wearable controller (e.g., a ring controller) and/or a handheld controller.

Although FIG. 16 shows system 100 as being part of media player device 1602, it is understood that one or more facilities of system 100 may be incorporated in or distributed across other computing devices in alternative implementations. For example, one or more of the operations performed by rendering facility 102 may be performed by a computing device (e.g., server) associated with virtual reality media provider system 1604 and/or another system that is separate from media player device 1602. In addition, storage facility 104 may be located remotely (e.g., as a cloud-based storage facility) from media player device 1602 in certain implementations.

Figure 20:
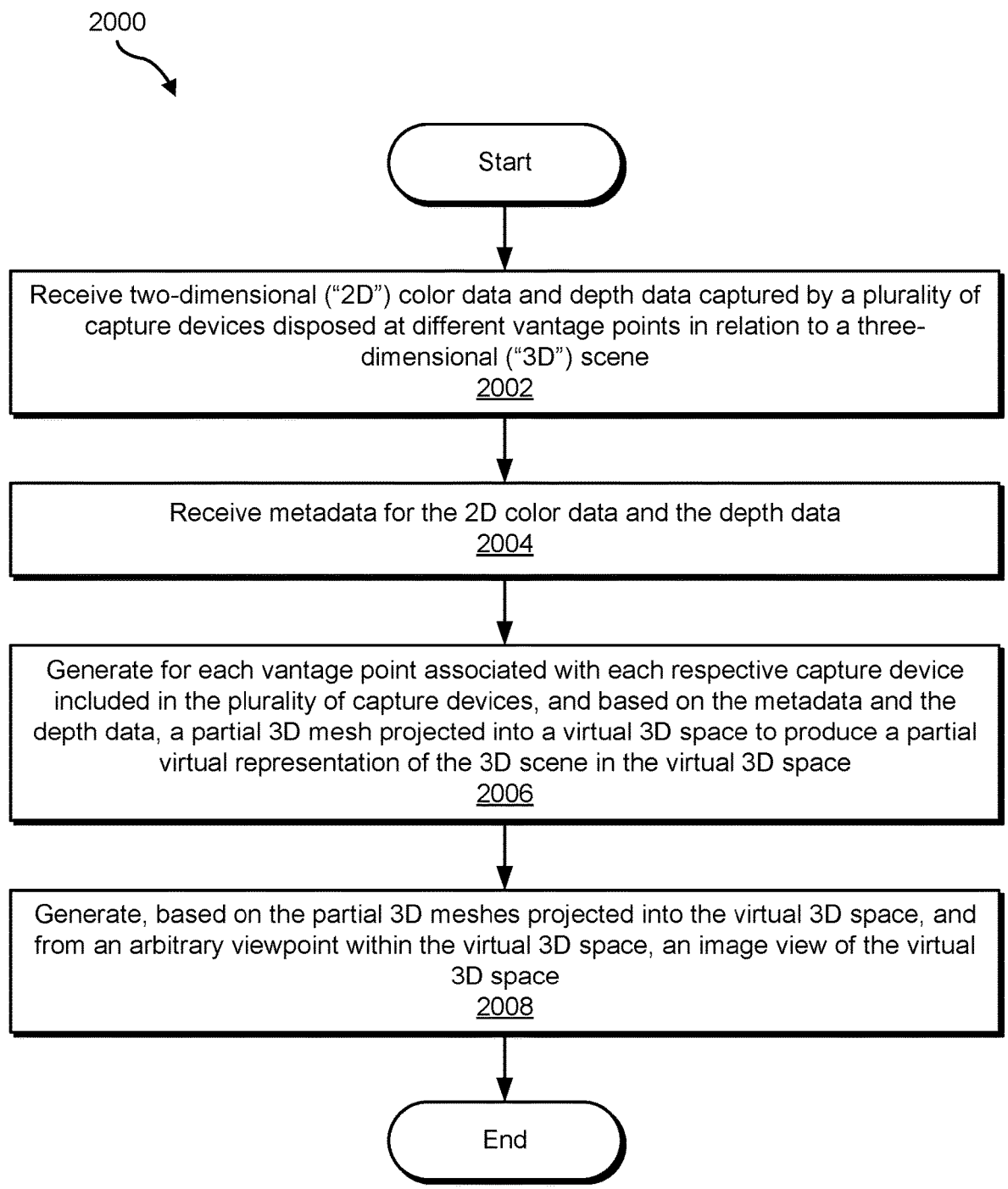
FIG. 20 illustrates an exemplary method for rendering virtual reality content based on 2D captured imagery of a 3D scene according to principles described herein.

FIG. 20 illustrates an exemplary method 2000 for rendering virtual reality content based on 2D captured imagery of a 3D scene. While FIG. 20 illustrates exemplary operations according to one embodiment, other embodiments may omit, add to, reorder, and/or modify any of the operations shown in FIG. 20. One or more of the operations shown in FIG. 20 may be performed by rendering system 100 and/or any implementation thereof.

In operation 2002, a virtual reality content rendering system (e.g., virtual reality content rendering system 100) may receive 2D color data and depth data captured by a plurality of capture devices disposed at different vantage points in relation to a 3D scene. Operation 2002 may be performed in any of the ways described herein.

In operation 2004, the virtual reality content rendering system may receive metadata for the 2D color data and the depth data. Operation 2004 may be performed in any of the ways described herein.

In operation 2006, the virtual reality content rendering system may generate, for each vantage point associated with each respective capture device included in the plurality of capture devices, and based on the metadata and the depth data, a partial 3D mesh projected into a virtual 3D space to produce a partial virtual representation of the 3D scene in the virtual 3D space. Operation 2006 may be performed in any of the ways described herein.

In operation 2008, the virtual reality content rendering system may generate, based on the partial 3D meshes projected into the virtual 3D space, and from an arbitrary viewpoint within the virtual 3D space, an image view of the virtual 3D space. In certain examples, the generating of the image view may include accumulating the partial 3D meshes projected into the virtual 3D space, and blending, based on the 2D color data, color samples for the partial 3D meshes to form the image view of the virtual 3D space. Operation 2008 may be performed in any of the ways described herein.

In certain examples, one or more operations of system 100 described herein may be performed in accordance with, as part of, and/or using a graphics pipeline of a GPU and/or graphics card (e.g., an OpenGL rendering pipeline). Such implementations of system 100 may leverage one or more capabilities, functions, and/or resources of the GPU and/or graphics card (e.g., existing video codecs designed to represent 2D data), including fixed functions, hardware-accelerated functions, and/or buffers of the GPU and/or graphics card (e.g., fixed-function rasterization, hardware-accelerated depth testing, a depth buffer, etc.).

In certain examples, a graphics pipeline may include at least vertex processing, rasterization, and fragment processing stages, and one or more operations of system 100 may be performed within these stages of the graphics pipeline. As an example, system 100 may generate partial 3D meshes, as described herein, within a vertex processing stage of the graphics pipeline. As another example, system 100 may project 2D input meshes to generate partial 3D meshes in a virtual 3D space, as described herein, using a vertex shader within the vertex processing stage of the graphics pipeline. As another example, system 100 may remove extraneous primitives of the partial 3D meshes and/or determine blend weights for primitives of the partial 3D meshes, as described herein, pre-rasterization using a geometry shader and/or a tessellation shader within the vertex processing stage of the graphics pipeline and/or post-rasterization using a fragment shader within a fragment processing stage of the graphics pipeline. As another example, system 100 may sample and blend color samples, as described herein, post-rasterization using a fragment shader within a fragment processing stage of the graphics pipeline.

In certain examples, system 100 may perform multiple passes on a data set (e.g., multiple passes on 2D color data, depth data, and metadata for one frame in a sequence of capture frames) in a way that leverages a graphics pipeline. For example, system 100 may iterate on the data set once to perform a depth pre-pass to establish an accumulation region within which to accumulate color samples, and may iterate on the data set again to accumulate color samples within the accumulation region. System 100 may iterate on the accumulated color samples to blend the color samples to form an image view that may be output for display.

Figure 21:
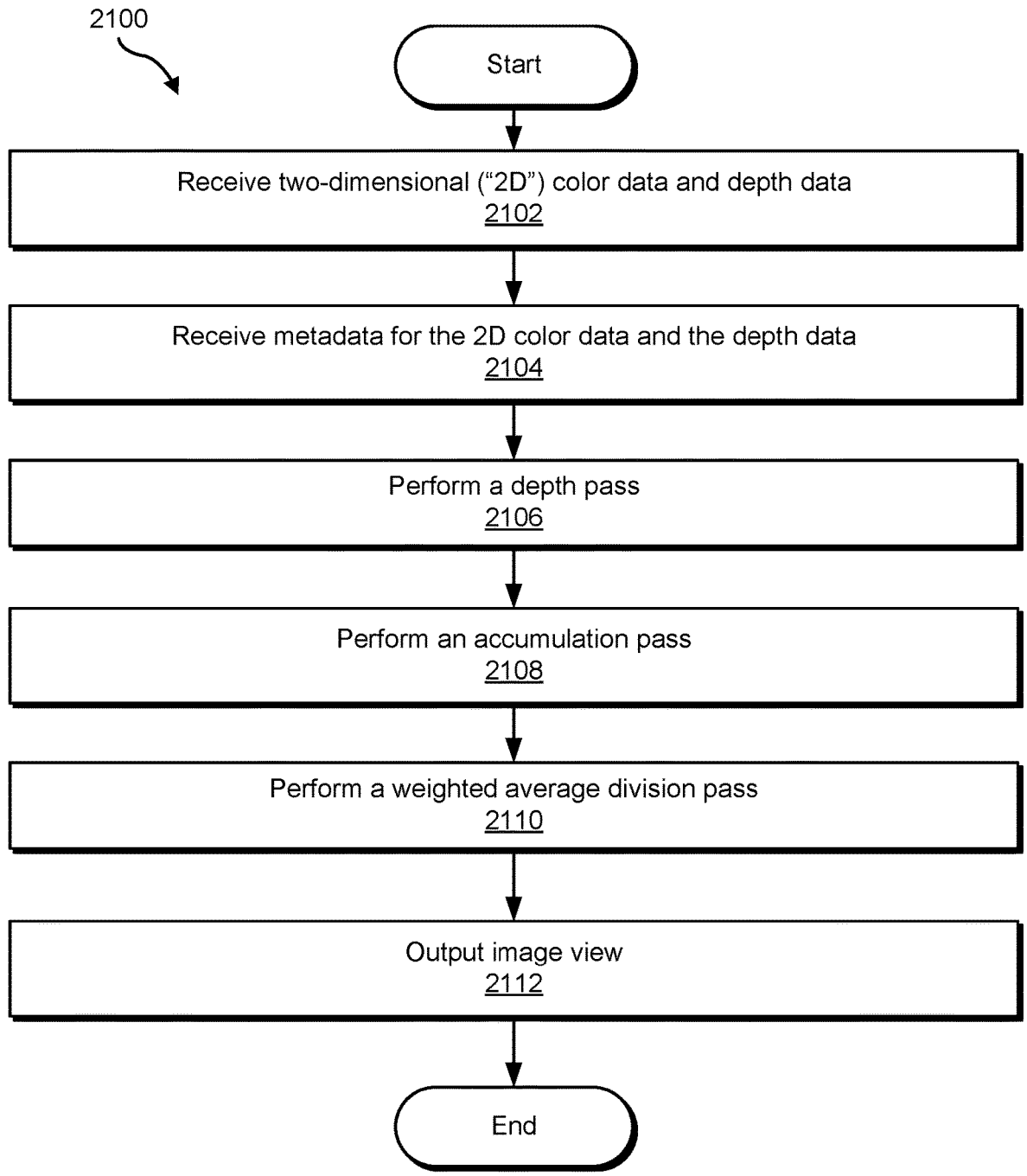
FIG. 21 illustrates another exemplary method for rendering virtual reality content based on 2D captured imagery of a 3D scene according to principles described herein.

FIG. 21 illustrates an exemplary method for rendering virtual reality content based on 2D captured imagery of a 3D scene according to principles described herein. While FIG. 21 illustrates exemplary operations according to one embodiment, other embodiments may omit, add to, reorder, and/or modify any of the operations shown in FIG. 21. One or more of the operations shown in FIG. 21 may be performed by a virtual reality content rendering system (e.g., virtual reality content rendering system 100) and/or by any implementation or combination thereof.

In operation 2102, a virtual reality content rendering system (e.g., virtual reality content rendering system 100) may receive 2D color data and depth data captured by a plurality of capture devices disposed at different vantage points in relation to a 3D scene. Operation 2102 may be performed in any of the ways described herein.

In operation 2104, the virtual reality content rendering system may receive metadata for the 2D color data and the depth data. Operation 2104 may be performed in any of the ways described herein.

In operation 2106, the virtual reality content rendering system may perform a depth pass (e.g., a depth pre-pass). The depth pass may include the virtual reality content rendering system transforming received depth data (e.g., captured depth data representing positions of objects in the 3D scene) and metadata (e.g., vantage point information) into 3D coordinates in a common virtual 3D space and projecting 2D input meshes for the vantage points into 3D coordinates in the virtual 3D space to form partial 3D meshes projected into the virtual 3D space, as described herein. The depth pass may also include the virtual reality content rendering system culling depth data, such as by depth testing, from the perspective of a selected arbitrary viewpoint within the virtual 3D space, to identify and omit occluded samples.

The depth pass may also include the virtual reality content rendering system determining, from a selected arbitrary viewpoint within virtual 3D space, an accumulation range within which color samples will be accumulated. The virtual reality content rendering system may determine the accumulation range by offsetting depth values nearest to the selected arbitrary viewpoint by translating along perspective from the selected arbitrary viewpoint, such as described herein. The virtual reality content rendering system may store data representative of the accumulation range, such as data representing a far value of the accumulation range, for use in the accumulation pass.

The depth pass may be set up for a depth test and a depth write, with a color write disabled. Accordingly, the virtual reality content rendering system may write data to a depth buffer during the depth pass. The data written to the depth buffer may include front-most depth sample values offset by the predetermined depth offset (i.e., the far value of the accumulation range). The virtual reality content rendering system may be configured not to clear the depth buffer before the accumulation pass such that the depth buffer may provide input to fixed-function depth testing performed in the accumulation pass. This may provide hardware-accelerated rejection of samples outside of the determined accumulation range (e.g., samples beyond the far value of the accumulation range), and samples that are outside of the accumulation range (e.g., samples beyond the depth offset) will not be output from rasterization. Samples that are within the accumulation range (i.e., samples in front of the far value of the accumulation range) will be selected and contribute to the drawn image view.

In operation 2108, the virtual reality content rendering system may perform an accumulation pass. The accumulation pass may include the virtual reality content rendering system transforming received depth data (e.g., captured depth data representing positions of objects in the 3D scene) and metadata (e.g., vantage point field of view coordinates) into 3D coordinates in a common virtual 3D space and projecting 2D input meshes for the vantage points into 3D coordinates in the virtual 3D space to form partial 3D meshes projected into the virtual 3D space, as described herein. The accumulation pass may also include the virtual reality content rendering system culling depth data, such as by depth testing, from the perspective of the selected arbitrary viewpoint within the virtual 3D space, to identify and omit occluded samples. The accumulation pass may also include the virtual reality content rendering system determining blend weights for primitives of the partial 3D meshes, such as described herein.

The accumulation pass may also include the virtual reality content rendering system rasterizing a perspective image view of the projected partial 3D meshes from the selected arbitrary viewpoint within the virtual 3D space and accumulating color samples, from the 2D color data (e.g., from a color video stream at input 2D coordinates), for 3D coordinates of the projected partial 3D meshes that are within the accumulation region established in the depth pass, as described herein. The color samples for the perspective image view may be accumulated in a frame buffer as described herein. In certain examples, the accumulating may use additive blending to accumulate a total of all fragment outputs, which blending may be a fixed-function operation in certain implementations. Blend weights determined in the accumulation pass may be used to multiply accumulated color samples that are then added together to determine a weighted total for all fragments, such as described herein.

The accumulation pass may be set up for a depth test and a color write, with a depth write disabled. Accordingly, the virtual reality content rendering system may write accumulated color sample data to an intermediary, high-precision frame buffer during the accumulation pass, as described herein.

In operation 2110, the virtual reality content rendering system may perform a weighted average division pass. The weighted average division pass may include the virtual reality content rendering system dividing accumulated, weighted color samples by a total of the blend weights to determine a weighted average of the accumulated color samples. The virtual reality content rendering system may draw a full-screen quad (e.g., a quad covering x/y [−1, 1] in clip coordinates) of the determined weighted averages to an output (e.g., display) frame buffer in step 2112. The content in the output frame buffer may be used by the virtual reality content rendering system and/or a media player device implementing the virtual reality content rendering system to display a perspective image view of the virtual 3D space that has been formed by the virtual reality content rendering system generating, accumulating, and blending partial 3D meshes as described herein.

In certain examples, method 2000 or method 2100 may be performed for a frame in a temporal sequence of frames. The frame may include a 2D color data frame, a depth data frame, and metadata associated with the frame (e.g., associated with a point in time corresponding to the frame). Accordingly, method 2000 or method 2100 may be repeated for each other frame in the temporal sequence of frames to produce video output of a dynamic perspective image view of a virtual 3D space representative of a captured 3D scene.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 22:
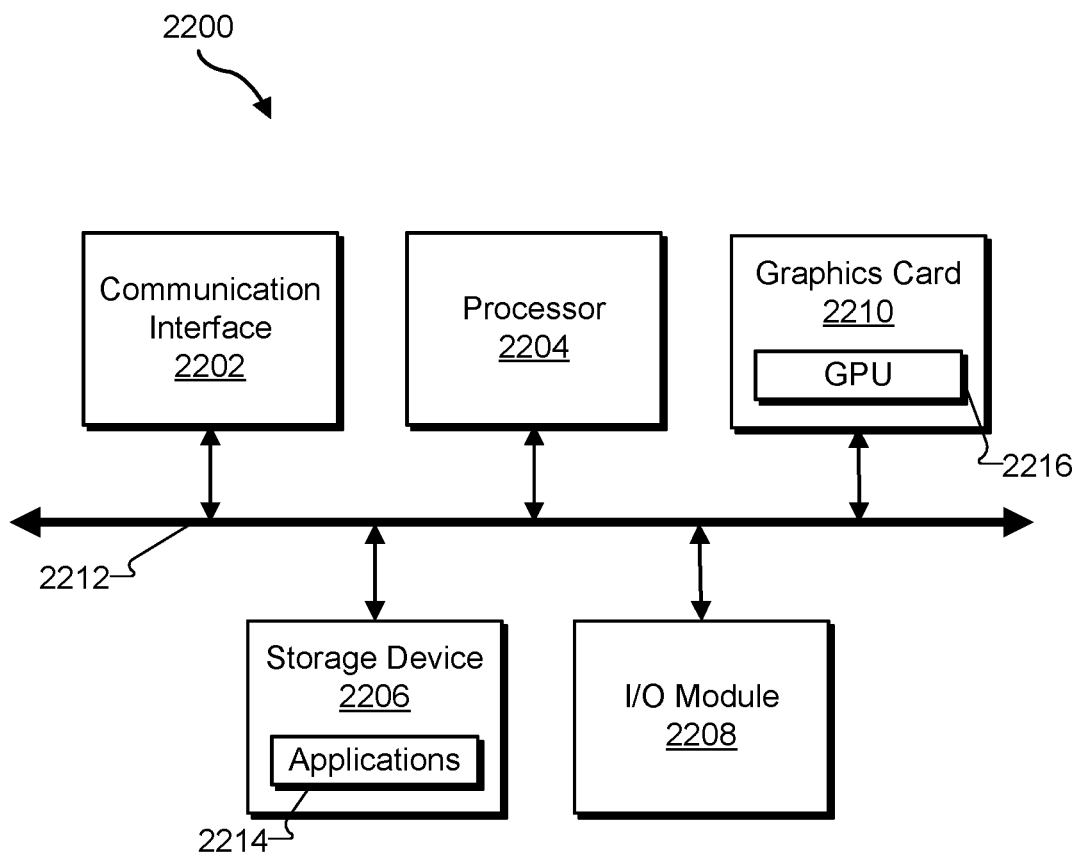
FIG. 22 illustrates an exemplary computing device according to principles described herein.

FIG. 22 illustrates an exemplary computing device 2200 that may be specifically configured to perform one or more of the processes described herein. As shown in FIG. 22, computing device 2200 may include a communication interface 2202, a processor 2204, a storage device 2206, an input/output ("I/O") module 2208, and a graphics card 2210 communicatively connected via a communication infrastructure 2212. While an exemplary computing device 2200 is shown in FIG. 22, the components illustrated in FIG. 22 are not intended to be limiting. Additional or alternative components may be used in other embodiments. Components of computing device 2200 shown in FIG. 22 will now be described in additional detail.

Communication interface 2202 may be configured to communicate with one or more computing devices. Examples of communication interface 2202 include, without limitation, a wired network interface (such as a network interface card), a wireless network interface (such as a wireless network interface card), a modem, an audio/video connection, and any other suitable interface.

Processor 2204 generally represents any type or form of processing unit (e.g., a central processing unit) capable of processing data or interpreting, executing, and/or directing execution of one or more of the instructions, processes, and/or operations described herein. Processor 2204 may direct execution of operations in accordance with one or more applications 2214 or other computer-executable instructions such as may be stored in storage device 2206 or another computer-readable medium.

Storage device 2206 may include one or more data storage media, devices, or configurations and may employ any type, form, and combination of data storage media and/or device. For example, storage device 2206 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 2206. For example, data representative of one or more executable applications 2214 configured to direct processor 2204 to perform any of the operations described herein may be stored within storage device 2206. In some examples, data may be arranged in one or more databases residing within storage device 2206. In certain examples, storage device 2206 may maintain surface data, metadata, data streams, video streams, transport streams, and/or any other data received, generated, managed, maintained, used, and/or transmitted to or by facility 102. Storage device 2206 may further include any other data as may be used by facility 102 to perform one of more of the operations described herein.

I/O module 2208 may include one or more I/O modules configured to receive user input and provide user output. One or more I/O modules may be used to receive input for a single virtual reality experience. I/O module 2208 may include any hardware, firmware, software, or combination thereof supportive of input and output capabilities. For example, I/O module 2208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 2208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 2208 is configured to provide graphical data to a display for presentation to a user. The graphical data may be representative of one or more graphical user interfaces and/or any other graphical content as may serve a particular implementation. I/O module 2208 may be omitted from certain implementations.

In some examples, any of the facilities described herein may be implemented by or within one or more components of computing device 2200. For example, one or more applications 2214 residing within storage device 2206 may be configured to direct processor 2204 to perform one or more processes or functions associated with rendering facility 102 of virtual reality content rendering system 100 (see FIG. 1). Alternatively, one or more applications 2214 residing within storage device 2206 may be configured to direct processor 2204 to perform one or more processes or functions associated with data decoding/demultiplexing system 1610 (see FIG. 16). Likewise, storage facility 104 of system 100 may be implemented by or within storage device 2206.

Graphics card 2210 may include any suitable graphics card (e.g., a commercially available graphics card) having dedicated video decoding hardware (e.g., one or more dedicated video decoders) and a programmable GPU 2216. Graphics card 2210 may include additional components in certain embodiments. Graphics card 2210 and/or GPU 2216 may be configured to execute and/or assist processor 2204 in executing one or more of the exemplary operations described herein. Graphics card 2210 may include any suitable number of graphics cards and/or GPUs as may suit a particular implementation.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

receiving, by a virtual reality content rendering system implemented by an end-user media player device, two-dimensional ("2D") color data and depth data captured by a plurality of capture devices disposed at different vantage points in relation to a three-dimensional ("3D") scene, the 2D color data and the depth data transmitted by way of a wide area network to the virtual reality content rendering system implemented by the end-user media player device;

receiving, by the virtual reality content rendering system, metadata for the 2D color data and the depth data;

generating, by the virtual reality content rendering system, for each vantage point associated with each respective capture device included in the plurality of capture devices, and based on the metadata and the depth data, a partial 3D mesh projected into a virtual 3D space to produce a partial representation of the 3D scene in the virtual 3D space, the generating of the partial 3D mesh comprising projecting, for each vantage point associated with each respective capture device included in the plurality of capture devices, a 2D input mesh along perspective rays to depths within the virtual 3D space based on the depth data to produce 3D coordinates of vertices of primitives of the partial 3D mesh in the virtual 3D space; and generating, by the virtual reality content rendering system based on the partial 3D meshes projected into the virtual 3D space, and from an arbitrary viewpoint within the virtual 3D space, an image view of the virtual 3D space, the generating of the image view comprising accumulating the partial 3D meshes projected into the virtual 3D space, and blending, based on the 2D color data, color samples for overlapping sections of the partial 3D meshes to form the image view of the virtual 3D space.

2. The method of claim 1, wherein the generating of the partial 3D mesh for each vantage point associated with each respective capture device included in the plurality of capture devices further comprises:

identifying, for each partial 3D mesh, one or more of the primitives of the partial 3D mesh as extraneous primitives; and removing the identified extraneous primitives from each partial 3D mesh.

3. The method of claim 2, wherein the identifying, for each partial 3D mesh, one or more of the primitives of the partial 3D mesh as extraneous primitives comprises at least one of:

identifying a first primitive of the partial 3D mesh as a first extraneous primitive based at least in part on the first primitive having a depth change that exceeds a predetermined depth change threshold; and identifying a second primitive of the partial 3D mesh as a second extraneous primitive based at least in part on the second primitive having a surface not facing the respective vantage point associated with the partial 3D mesh.

4. The method of claim 1, wherein the blending of the color samples for the overlapping sections of the partial 3D meshes to form the image view of the virtual 3D space comprises:

determining blend weights for the primitives of the partial 3D meshes;

weighting the color samples for the partial 3D meshes based on the determined blend weights for the primitives of the partial 3D meshes; and determining weighted averages of the weighted color samples for superimposed primitives included in the overlapping sections of the partial 3D meshes.

5. The method of claim 1, wherein:

the accumulating of the partial 3D meshes projected into the virtual 3D space comprises accumulating the color samples for the partial 3D meshes in a frame buffer; and the blending of the color samples for the overlapping sections of the partial 3D meshes to form the image view of the virtual 3D space comprises additively blending the color samples for the overlapping sections of the partial 3D meshes in the frame buffer.

6. The method of claim 1, further comprising:

determining, by the virtual reality content rendering system based on the partial 3D meshes projected into the virtual 3D space, and from the arbitrary viewpoint within the virtual 3D space, an accumulation region;

wherein the accumulating of the partial 3D meshes and the blending of the color samples for the overlapping sections of the partial 3D meshes to form the image view of the virtual 3D space are performed only for fragments that are within the accumulation region.

7. The method of claim 1, embodied as computer-executable instructions on at least one non-transitory computer-readable medium.

8. A non-transitory computer-readable medium storing instructions that, when executed, direct at least one processor of an end-user media player device to:

receive two-dimensional ("2D") color data and depth data captured by a plurality of capture devices disposed at different vantage points in relation to a three-dimensional ("3D") scene, the 2D color data and the depth data transmitted by way of a wide area network to the end-user media player device, receive metadata for the 2D color data and the depth data, generate, for each vantage point associated with each respective capture device included in the plurality of capture devices, and based on the metadata and the depth data, a partial 3D mesh projected into a virtual 3D space to produce a partial representation of the 3D scene in the virtual 3D space, the generating of the partial 3D mesh comprising projecting, for each vantage point associated with each respective capture device included in the plurality of capture devices, a 2D input mesh along perspective rays to depths within the virtual 3D space based on the depth data to produce 3D coordinates of vertices of primitives of the partial 3D mesh in the virtual 3D space, and generate, based on the partial 3D meshes projected into the virtual 3D space, and from an arbitrary viewpoint within the virtual 3D space, an image view of the virtual 3D space, the generating of the image view comprising blending, based on the 2D color data, color samples for overlapping sections of the partial 3D meshes to form the image view of the virtual 3D space.

9. The non-transitory computer-readable medium of claim 8, wherein the generating of the partial 3D mesh for each vantage point associated with each respective capture device included in the plurality of capture devices further comprises the instructions, when executed, directing the at least one processor to:

identify, for each partial 3D mesh, one or more of the primitives of the partial 3D mesh as extraneous primitives; and remove the identified extraneous primitives from each partial 3D mesh.

10. The non-transitory computer-readable medium of claim 8, wherein the blending of the color samples for the overlapping sections of the partial 3D meshes to form the image view of the virtual 3D space comprises the instructions, when executed, directing the at least one processor to:
determine blend weights for the primitives of the partial 3D meshes;
weight the color samples for the partial 3D meshes based on the determined blend weights for the primitives of the partial 3D meshes; and
determine weighted averages of the weighted color samples for superimposed primitives included in the overlapping sections of the partial 3D meshes.

11. The non-transitory computer-readable medium of claim 8, wherein the blending of the color samples for the overlapping sections of the partial 3D meshes to form the image view of the virtual 3D space comprises the instructions, when executed, directing the at least one processor to accumulate the color samples for the partial 3D meshes in a frame buffer.

12. The non-transitory computer-readable medium of claim 8, further comprising instructions that, when executed, direct the at least one processor to determine, based on the partial 3D meshes projected into the virtual 3D space, and from the arbitrary viewpoint within the virtual 3D space, an accumulation region;
wherein the blending of the color samples for the overlapping sections of the partial 3D meshes to form the image view of the virtual 3D space is performed only for color samples that are within the accumulation region.

13. A system comprising:
at least one computer processor implemented by an end-user media player device; and
a virtual reality rendering facility that directs the at least one computer processor to:
receive two-dimensional ("2D") color data and depth data captured by a plurality of capture devices disposed at different vantage points in relation to a three-dimensional ("3D") scene, the 2D color data and the depth data transmitted by way of a wide area network to the at least one processor implemented by the end-user media player device,
receive metadata for the 2D color data and the depth data,
generate, for each vantage point associated with each respective capture device included in the plurality of capture devices, and based on the metadata and the depth data, a partial 3D mesh projected into a virtual 3D space to produce a partial representation of the 3D scene in the virtual 3D space, the generating of the partial 3D mesh comprising projecting, for each vantage point associated with each respective capture device included in the plurality of capture devices, a 2D input mesh along perspective rays to depths within the virtual 3D space based on the depth data to produce 3D coordinates of vertices of primitives of the partial 3D mesh in the virtual 3D space, and
generate, based on the partial 3D meshes projected into the virtual 3D space, and from an arbitrary viewpoint within the virtual 3D space, an image view of the virtual 3D space, the generating of the image view comprising blending, based on the 2D color data, color samples for overlapping sections of the partial 3D meshes to form the image view of the virtual 3D space.

14. The system of claim 13, wherein the generating of the partial 3D mesh for each vantage point associated with each respective capture device included in the plurality of capture devices further comprises:
the virtual reality rendering facility directing the at least one computer processor to identify, for each partial 3D mesh, one or more of the primitives of the partial 3D mesh as extraneous primitives; and
the virtual reality rendering facility directing the at least one computer processor to remove the identified extraneous primitives from each partial 3D mesh.

15. The system of claim 14, wherein the identifying, for each partial 3D mesh, one or more of the primitives of the partial 3D mesh as extraneous primitives comprises at least one of:
identifying a first primitive of the partial 3D mesh as a first extraneous primitive based at least in part on the first primitive having a depth change that exceeds a predetermined depth change threshold; and
identifying a second primitive of the partial 3D mesh as a second extraneous primitive based at least in part on the second primitive having a surface not facing the respective vantage point associated with the partial 3D mesh.

16. The system of claim 13, wherein the blending of the color samples for the overlapping sections of the partial 3D meshes to form the image view of the virtual 3D space comprises:
the virtual reality rendering facility directing the at least one computer processor to determine blend weights for the primitives of the partial 3D meshes;
the virtual reality rendering facility directing the at least one computer processor to weight the color samples for the partial 3D meshes based on the determined blend weights for the primitives of the partial 3D meshes; and
the virtual reality rendering facility directing the at least one computer processor to determine weighted averages of the weighted color samples for superimposed primitives included in overlapping areas of the partial 3D meshes.

17. The system of claim 13, wherein the blending of the color samples for the overlapping sections of the partial 3D meshes to form the image view of the virtual 3D space comprises the virtual reality rendering facility directing the at least one computer processor to accumulate the color samples for the partial 3D meshes in a frame buffer.

18. The system of claim 17, wherein the blending of the color samples for the overlapping sections of the partial 3D meshes to form the image view of the virtual 3D space further comprises additively blending the color samples for the overlapping sections of the partial 3D meshes in the frame buffer.

19. The system of claim 17, wherein the at least one computer processor comprises a graphics processing unit ("GPU"); and
the frame buffer in which the color samples for the partial 3D meshes are accumulated is included as part of the GPU.

20. The system of claim 13, further comprising the virtual reality rendering facility directing the at least one computer processor to determine, based on the partial 3D meshes projected into the virtual 3D space, and from the arbitrary viewpoint within the virtual 3D space, an accumulation region;
  wherein the blending of the color samples for the overlapping sections of the partial 3D meshes to form the image view of the virtual 3D space is performed only for color samples that are within the accumulation region.

* * * * *